(12) United States Patent
Nakamura et al.

(10) Patent No.: US 12,734,574 B2
(45) Date of Patent: Sep. 15, 2026

(54) PRESS-FORMED PRODUCT, ROLLING BEARING, VEHICLE, MACHINE, PRESS-FORMED PRODUCT MANUFACTURING METHOD, ROLLING BEARING MANUFACTURING METHOD, VEHICLE MANUFACTURING METHOD, AND MACHINE MANUFACTURING METHOD

(71) Applicant: NSK LTD., Tokyo (JP)

(72) Inventors: Seiji Nakamura, Fujisawa (JP); Manabu Sekiguchi, Takasaki (JP)

(73) Assignee: NSK LTD., Tokyo (JP)

( * ) Notice: Subject to any disclaimer, the term of this patent is extended or adjusted under 35 U.S.C. 154(b) by 505 days.

(21) Appl. No.: 18/037,620

(22) PCT Filed: Jan. 25, 2022

(86) PCT No.: PCT/JP2022/002646
§ 371 (c)(1),
(2) Date: May 18, 2023

(87) PCT Pub. No.: WO2022/163642
PCT Pub. Date: Aug. 4, 2022

(65) Prior Publication Data

US 2024/0342784 A1 Oct. 17, 2024

(30) Foreign Application Priority Data

Jan. 26, 2021 (JP) ................................ 2021-010178

(51) Int. Cl.
*F16C 33/64* (2006.01)
*B21D 28/16* (2006.01)
(Continued)

(52) U.S. Cl.
CPC ............ *B21D 28/16* (2013.01); *B21D 53/10* (2013.01); *F16C 19/30* (2013.01); *F16C 19/305* (2013.01);
(Continued)

(58) Field of Classification Search
CPC ......... B21D 28/16; B21D 53/10; F16C 19/30; F16C 19/305; F16C 2220/84;
(Continued)

(56) References Cited

U.S. PATENT DOCUMENTS

2006/0126984 A1* 6/2006 Takamizawa ....... F16C 33/4635 384/572
2008/0014036 A1* 1/2008 Ueki ...................... B21D 28/16 409/1
2019/0291160 A1* 9/2019 Fortmeier ........... B23D 31/002

FOREIGN PATENT DOCUMENTS

JP 11-344029 A 12/1999
JP 2006-247738 A 9/2006
(Continued)

OTHER PUBLICATIONS

Extended European Search Report issued Jul. 3, 2023, in European Application No. 22745862.7.
(Continued)

*Primary Examiner* — Jun S Yoo
(74) *Attorney, Agent, or Firm* — Sughrue Mion, PLLC

(57) ABSTRACT

A press-formed product manufacturing method includes obtaining a first piece (19, 55) by punching a metal material, obtaining a second piece (28, 50) by comprising an edge of a second surface (8) of the first piece (19, 53) sandwiching the first piece (19, 55) between a first die (25) and a second die (26), and trimming a second piece (28) by using press working.

8 Claims, 12 Drawing Sheets

(51) Int. Cl.
*B21D 53/10* (2006.01)
*F16C 19/30* (2006.01)

(52) U.S. Cl.
CPC ...... *F16C 2220/84* (2013.01); *F16C 2326/01* (2013.01)

(58) Field of Classification Search
CPC .... F16C 2326/01; F16C 33/543; F16C 19/10; F16C 19/12; F16C 19/32; F16C 33/588; F16C 33/64
See application file for complete search history.

(56) References Cited

FOREIGN PATENT DOCUMENTS

| | | |
|---|---|---|
| JP | 2007-216293 A | 8/2007 |
| JP | 2020-193652 A | 12/2020 |

OTHER PUBLICATIONS

International Search Report for PCT/JP2022/002646 dated Mar. 15, 2022.
Written Opinion for PCT/JP2022/002646 dated Mar. 15, 2022.

* cited by examiner

LONGITUDINAL DIRECTION
WIDTH DIRECTION
ST1
ST2
ST3
ST4
ST5
ST6
ST7
ST8
37
38
38a
38b
39
41
42
43
55
56
11 (7)
A
B
C
D

PRESS-FORMED PRODUCT, ROLLING BEARING, VEHICLE, MACHINE, PRESS-FORMED PRODUCT MANUFACTURING METHOD, ROLLING BEARING MANUFACTURING METHOD, VEHICLE MANUFACTURING METHOD, AND MACHINE MANUFACTURING METHOD

CROSS REFERENCE TO RELATED APPLICATIONS

This application is a National Stage of International Application No. PCT/JP2022/002646 filed Jan. 25, 2022, claiming priority based on Japanese Patent Application No. 2021-010178 filed Jan. 26, 2021.

TECHNICAL FIELD

The present invention relates to a press-formed product, a rolling bearing, a vehicle, a machine, a press-formed product manufacturing method, a rolling bearing manufacturing method, a vehicle manufacturing method, and a machine manufacturing method.

Priority is claimed on Japanese Patent Application No. 2021-010178, filed Jan. 26, 2021, the content of which is incorporated herein by reference.

BACKGROUND ART

A thrust rolling bearing which is a kind of rolling bearing is assembled to rotating support portions of various rotating machines such as a transmission for an automobile and a compressor for a refrigerator to support a thrust load applied to a rotating member such as a rotating shaft.

FIG. 16 shows an example of a thrust rolling bearing having a conventional structure described in Japanese Patent Application No. H11-344029 (Patent Literature 1). A thrust rolling bearing 100 includes a pair of thrust races 101*a* and 101*b*, a plurality of rollers 102, and a cage 103.

Each of the pair of thrust races 101*a* and 101*b* has an annular flat plate shape as a whole and includes thrust raceway surfaces 104*a* and 1046 provided on one of axially facing surfaces. The plurality of rollers 102 have a substantially columnar shape and are arranged between the pair of thrust raceway surfaces 104*a* and 104*b* while their center axes are oriented in the radial direction. The cage 103 includes pockets 105 at equal intervals in the circumferential direction and the roller 102 is rotatably held inside each pocket 105.

As shown in FIG. 17, the thrust race 101*a* (101*b*) constituting the thrust rolling bearing 100 having a conventional structure has a substantially rectangular cross-sectional shape. The thrust race 101*a* (101*b*) includes the thrust raceway surface 104*a* (104*b*) having a flat surface shape and provided in a radial intermediate portion in a surface on one axial side (the upper side of FIG. 17) and a chamfered portion (R chamfer) 106 at both ends in the radial direction. In the thrust race 101*a* (101*b*) having the conventional structure with the R chamfer, the ratio of the radial width Lx of the thrust raceway surface 104*a* (104*b*) with respect to the radial width La of the thrust race 101*a* (101*b*) can be increased. Thus, it is advantageous in terms of reducing the size of the thrust rolling bearing 100. Additionally, the thrust race 101*a* (101*b*) shown in FIG. 17 also includes a chamfered portion 106 provided at both radial end portions in a surface on the other axial side (the lower side of FIG. 17).

The thrust race having the conventional structure is manufactured through the steps shown in FIG. 18.

First, an annular flat plate-shaped blank is punched from a metal plate by a punching step using a press. Next, the surface of the blank is smoothed by a grinding step (plane grinding) and the dimensions of each part of the blank are adjusted by a turning step. Specifically, roll-overs (shear drops) generated on inner and outer peripheral edges of the surface of the blank on the front side of the punching direction and burrs or the like generated on inner and outer peripheral edges of the surface of the blank on the rear side of the punching direction are removed and four corners of the blank are chamfered. Next, deformation such as waviness generated by a heat treatment is removed by a grinding step after the heat treatment. Then, an inspecting and packaging step is performed finally after a barrel finishing step.

CITATION LIST

Patent Literature

Patent Literature 1

Japanese Patent Application. Publication No. H11-344029

SUMMARY OF INVENTION

Technical Problem

The thrust race having the conventional structure is a kind of press-formed product and one axial surface (axial surface) is composed of a thrust raceway surface disposed at a radial intermediate portion and a chamfered portion disposed at both radial end portions. Therefore, since a contact surface pressure (edge stress) applied to both radial end portions of the thrust raceway surface may become excessive depending on the operating condition of the thrust rolling bearing, there is a possibility that the bearing life may be shortened.

Further, in a method of manufacturing the conventionally known thrust race, it is necessary to perform a removal process (post-treatment) such as a grinding process accompanied by the generation of shavings before a heat treatment step in order to remove deformation such as a roll-over (sagging) generated by a punching process. Therefore, since it is necessary to use a metal plate (material) having a plate thickness larger than that of the thrust race corresponding to a product by the amount of cutting allowance, the yield of the thrust race deteriorates. Further, the number of processing steps increases and hence the manufacturing cost of the thrust race increases.

Here, the present inventors have repeated a research on a method of reducing a roll-over generated by a punching process by a method other than a removal process such as a grinding process and examined first to third methods using press working (shearing).

The first method is a method of reducing a clearance between a die and a punch used during punching. According to the first method, it is possible to reduce a roll-over generated by a punching process. However, since the first method requires a large press load, there is a problem in which the life of the mold is shortened and a problem in which a secondary sheared surface is generated in a blank.

The second method is a method of scraping off, by a shaving process, a cut end (inner peripheral surface and outer peripheral surface) of the blank generated by a punching process a plurality of times. According to the second method, it is possible to reduce a roll-over generated by a punching process. However, the second method has a problem in which the number of steps increases and a problem in which thread-like shavings are generated, and dents are easily formed on a thrust race corresponding to a product.

The third method is a punching method performed while the ductility of a material is improved by fine blanking or semi-fine blanking. According to the third method, a sheared surface can be improved, but the effect of suppressing a roll-over generated by punching is small. Further, the third method has a problem in which a blank is liable to be curved and a problem in which a dedicated facility is required.

In both the first method and the second method using shearing, the roll-over generated by punching can be reduced, but it is difficult to adopt these methods since another problem is caused instead. Further, the roll-over generated by punching cannot be sufficiently reduced depending on the third method.

An object of an aspect of the present invention is to provide a press-formed product capable of suppressing an excessive contact surface pressure from being applied to both radial end portions of an axial surface when a load is applied to the axial surface. Further, an object of an aspect of the present invention is to provide a press-formed product manufacturing method capable of reducing a roll-over generated by a punching process without performing a removal process such as a grinding process accompanied by the generation of shavings.

Solution to Problem

In an aspect of the present invention, a method of manufacturing a press-formed product includes: obtaining a first piece by punching a metal material, the first piece including a first surface and a second surface which is a surface on the side opposite to the first surface and the first surface including a roll-over formed on an edge of the first surface by the punching; obtaining a second piece by depressing an edge of the second surface of the first piece while sandwiching the first piece between a first die and a second die, the second piece including a first portion having the first surface provided with the roll-over and a second portion having the second surface with the depressed edge; and trimming the second piece by using press working to remove at least a part of the edge of the first portion.

In an aspect of the present invention, a method of manufacturing a rolling bearing including a press-formed product and a plurality of rolling elements includes: manufacturing the press-formed product by the press formed product manufacturing method; and assembling a rolling bearing by using the manufactured press-formed product and the plurality of rolling elements.

In an aspect of the present invention, a method of manufacturing a vehicle including a rolling bearing includes: manufacturing the rolling bearing by the rolling bearing manufacturing method.

In an aspect of the present invention, a method of manufacturing a machine including a rolling bearing includes: manufacturing the rolling bearing by the rolling bearing manufacturing method.

In an aspect of the present invention, a rolling bearing includes: a press-formed product manufactured by the press-formed product manufacturing method; and a plurality of rolling elements.

In an aspect of the present invention, a press-formed product includes: a first surface; a second surface which is a surface on the side opposite to the first surface; a side surface which connects the first surface and the second surface; a first roll-over which is formed on an edge of the first surface as a trace of press working in the vicinity of a corner between the first surface and the side surface; and a second roll-over which is formed on an edge of the second surface as a trace of another press working in the vicinity of a corner between the second surface and the side surface.

In an example, the press-formed product has a flat plate shape. For example, the press-formed product has an annular flat plate shape or a disk shape. In another example, the press-formed product can have another shape.

In an aspect of the present invention, a press-formed product includes: a first surface which is provided on one axial side; and a second surface which is provided on the other axial side, wherein the first surface includes each of a first inner peripheral side roll-over provided on an inner peripheral edge, a first outer peripheral side roll-over provided on an outer peripheral edge, and a first flat portion having a flat surface shape and provided between the first inner peripheral side roll-over and the first outer peripheral side roll-over, and wherein the second surface includes each of a second inner peripheral side roll-over provided on an inner peripheral edge, a second outer peripheral side roll-over provided on an outer peripheral edge, and a second flat portion having a flat surface shape and provided between the second inner peripheral side roll-over and the second outer peripheral side roll-over.

In an aspect of the present invention, the rolling bearing includes the press-formed product and the plurality of rolling elements.

In an aspect of the present invention, the vehicle includes the press-formed product.

In an aspect of the present invention, the machine includes the press-formed product.

Advantageous Effects of Invention

According to the press-formed product of an aspect of the present invention, it is possible to suppress an excessive contact surface pressure from being applied to both radial end portions of the axial surface even when a load is applied to the axial surface. Further, according to the press-formed product manufacturing method of an aspect of the present invention, it is possible to reduce the roll-over generated by a punching process without performing the removal process such as a grinding process accompanied by the generation of shavings.

BRIEF DESCRIPTION OF DRAWINGS

Part (A) of FIG. 1 is a half cross-sectional view of a thrust rolling bearing according to a first embodiment and part (B) is an exploded perspective view of the thrust rolling bearing.

DESCRIPTION OF EMBODIMENTS

First Embodiment

Figure 1:
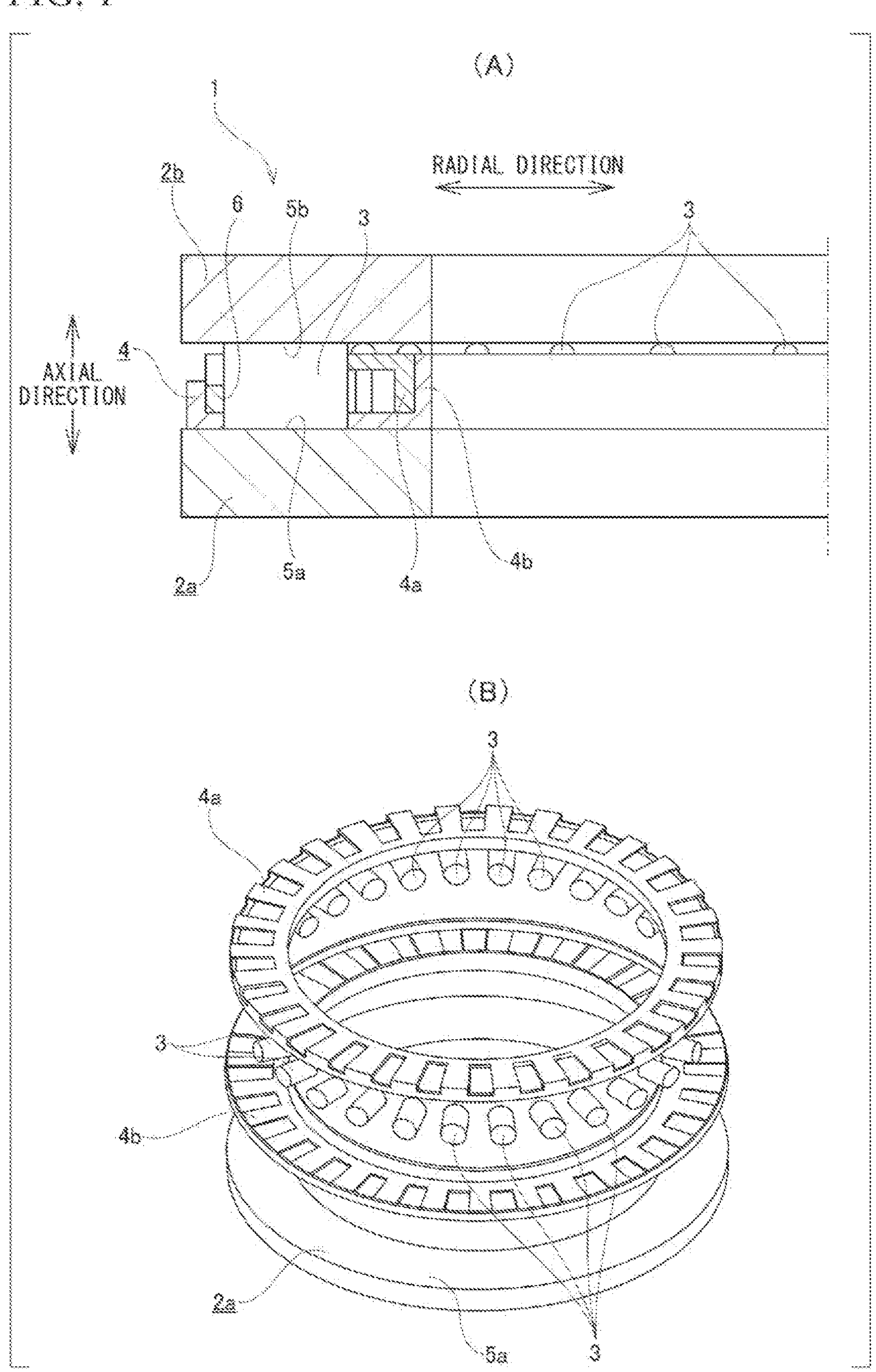

A first embodiment will be described with reference to FIGS. 1 to 9.

(Overall Configuration of Thrust Rolling Bearing)

In this embodiment, a thrust rolling bearing 1 is a kind of rolling bearing and is assembled to a swash plate compressor, an automobile transmission, or the like. The thrust rolling bearing 1 includes, as shown in part (A) and part (B) of FIG. 1, a pair of thrust races 2*a* and 2*b* and a plurality of rollers 3, and a cage 4. Additionally, one thrust race 2*b* is omitted in FIG. 1(B). However, when a thrust raceway surface is directly formed on a rotating member such as a rotating shaft, the thrust rolling bearing of the present invention can include a thrust races a plurality of rollers, and a cage.

Each of the pair of thrust races 2*a* and 2*b* is made of metal such as an iron-based alloy and has an annular flat plate shape as a whole. The pair of thrust races 2*a* and 2*b* is coaxially arranged and includes thrust raceway surfaces 5*a* and 5*b* formed on one of the axially opposite surfaces (axial surfaces). In this example, each of the pair of thrust races 2*a* and 2*b* corresponds to the press-formed product of the present invention.

The plurality of rollers 3 are made of metal such as high carbon chrome bearing steel and have a substantially cylindrical shape. The plurality of rollers 3 are arranged between the pair of thrust raceway surfaces 5*a* and 5*b* with their central axes oriented in the radial direction. Additionally, the roller 3 includes a needle.

The cage 4 is made of metal such as a copper-based alloy, and includes pockets 6 at equal intervals in the circumferential direction. The roller 3 is rotatably held inside each pocket 6. The cage 4 is configured by combining a pair of metal plates 4*a* and 4*b* each having a U-shaped cross-section and an entire annular shape.

Next, the specific structure of the thrust races 2*a* and 2*b* will be described. However, in the thrust rolling bearing 1 of this example, since the pair of thrust races 2*a* and 2*b* has the same configuration, the following description will be given only to one thrust race 2*a*, and the description of the other thrust race 2*b* will be omitted.

<Description of Thrust Race Structure>

Figure 2:
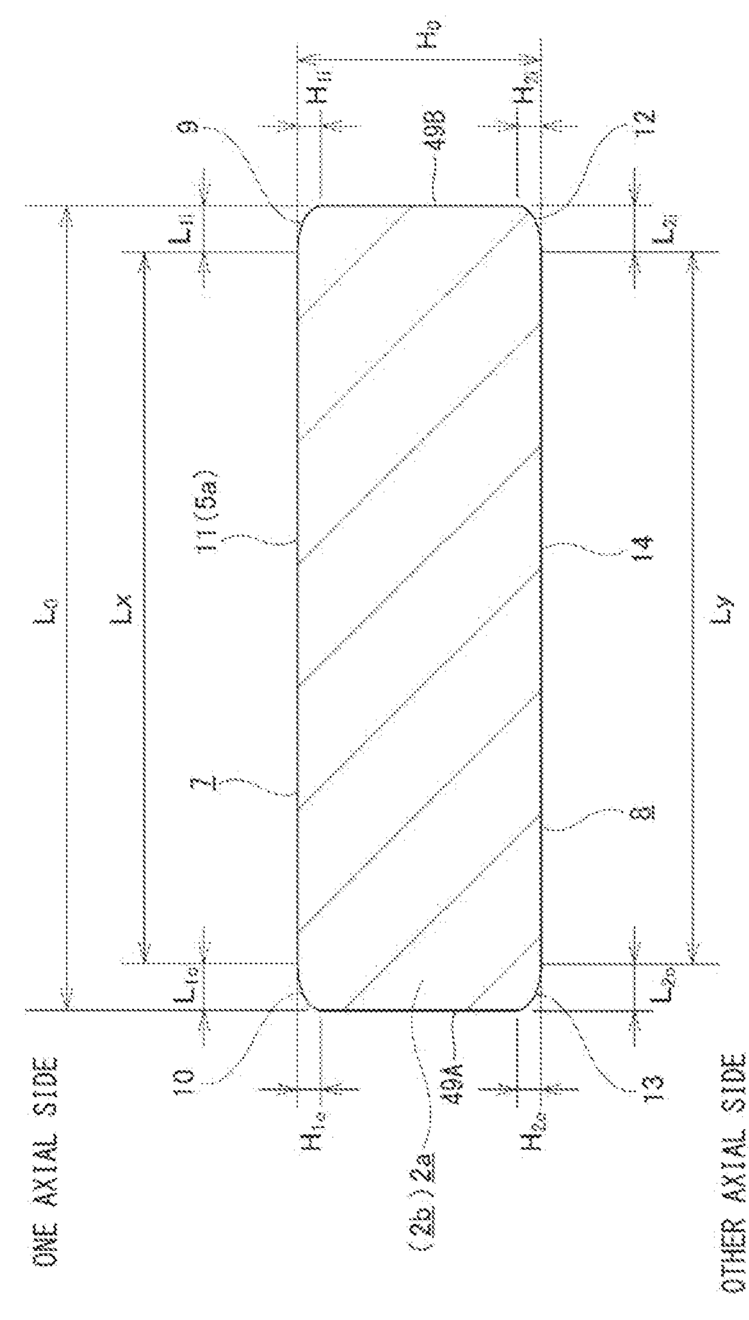
FIG. 2 is a cross-sectional view of a thrust race.

The thrust race 2*a* of this example is a press-formed product and has a substantially rectangular cross-sectional shape as shown in FIG. 2. The thrust race 2*a* includes a first surface 7 which is formed on one axial side (upper side of FIG. 2) facing the thrust race 2*b* to have a circular annular shape and includes a second surface 8 which is formed on the other axial side (lower side of FIG. 2) to have a circular annular shape. Additionally, the axial direction of the thrust race 2*a* matches the plate thickness direction of the thrust race 2*a*. The thrust race 2*a* includes a first surface 7, a second surface 8 which is a surface on the side opposite to the first surface 7, side surfaces 49A and 49B which connect the first surface 7 and the second surface 8, first roll-overs 9 and 10 which are formed on the edge of the first surface 7 as a trace of press working in the vicinity of the corner between the first surface 7 and the side surfaces 49A and 49B, and second roll-overs 12 and 13 which are formed on the edge of the second surface 8 as a trace of another press working in the vicinity of the corner between the second surface 8 and the side surfaces 49A and 49B. In an example, the surface 49A includes a sheared surface which is connected to the first roll-over 10 and another sheared surface which is connected to the second roll-over 13. Further, the surface 49B includes a sheared surface which is connected to the first roll-over 9 and another sheared surface which is connected to the second roll-over 12. The first roll-overs 9 and 10 include additional traces in which a part of the roll-over formed by first press working is trimmed by second press working. The additional traces can be confirmed based on the surface observation of the roll-overs 9 and 10, the surface observation of the side surfaces 49A and 49B, the observation of the cross-section of the object, the composition analysis of the object, and the like.

The first surface 7 of the thrust race 2*a* includes the first inner peripheral side roll-over 9, the first outer peripheral side roll-over 10, and a first flat portion (non-grinding surface) 11.

Figure 17:
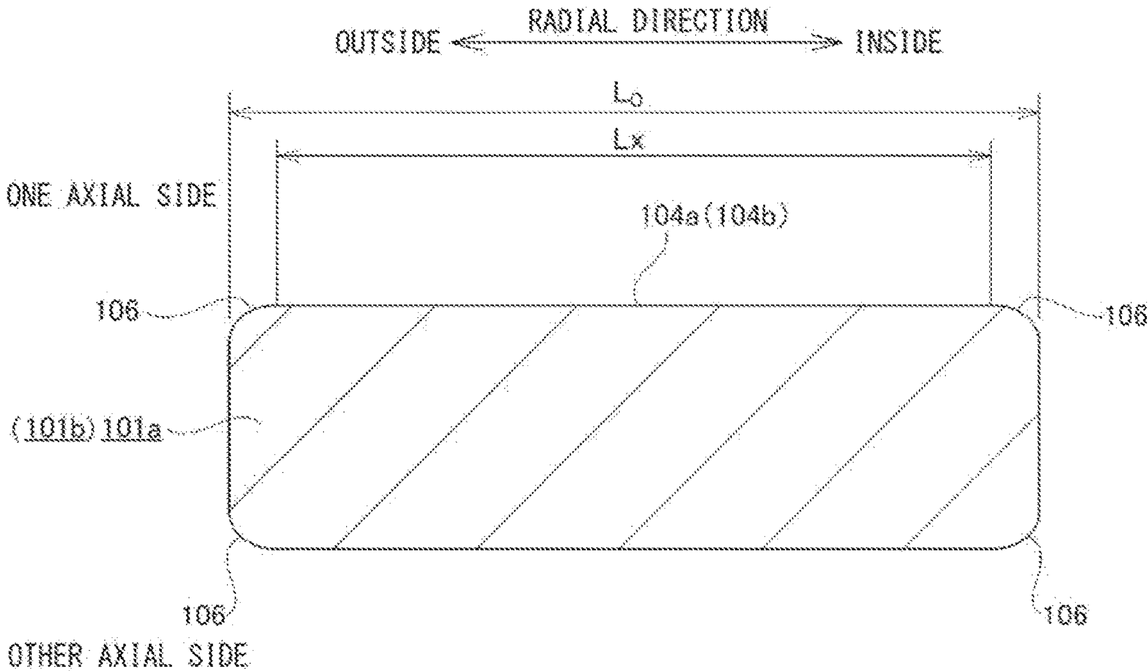
FIG. 17 is a cross-sectional view showing an example of a thrust race having a conventional structure.
Figure 18:
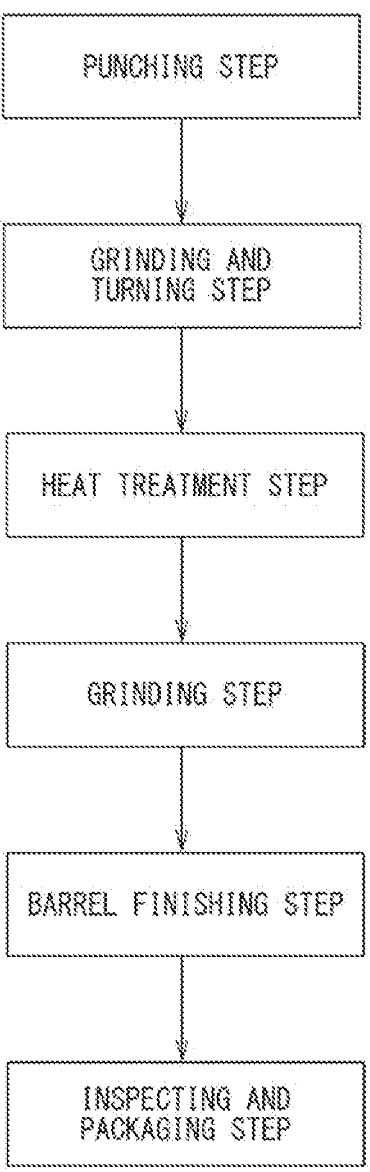
FIG. 18 is a flowchart showing a conventionally known thrust race manufacturing process.

The first inner peripheral side roll-over 9 has a generatrix shape (contour) which is at least partially curved and is provided on the inner peripheral edge of the first surface 7. The generatrix shape (contour) of the first inner peripheral side roll-over 9 is inclined in a curved shape toward the other axial side as it goes toward the radial inner side. The roll-over 9 has a surface shape in which the inclination (inclination angle) with respect to the reference plane (plane perpendicular to the axial direction) increases toward the edge (corner). The surface of the roll-over 9 has a relatively small inclination with respect to the reference plane in a region relatively far from the edge, and a relatively large inclination with respect to the reference plane in a region relatively close to the edge. The generatrix shape of the first inner peripheral side roll-over 9 has a gentle inclination with respect to a chamfered portion 106 provided on an inner peripheral edge of a thrust race 101*a* (101*b*) having a conventional structure shown in FIG. 17 above and has a small amount of depression (displacement) to the other axial side. As will be described later, the first inner peripheral side roll-over 9 is a part (radial outer portion) of the first inner peripheral side roll-over 20 formed by the punching step using a press.

In an example, when the radial width of the thrust race 2*a* is $L_0$, the axial width of the thrust race 2*a* is $H_0$, the radial width of the first inner peripheral side roll-over 9 is $L_{1i}$, and the axial width of the first inner peripheral side roll-over 9 is $H_{1i}$. $L_{1i}/L_0$ is 0.03 or more and 0.26 or less, and preferably 0.035 or more and 0.26 or less. Further, $H_{1i}/H_0$ is 0.0025 or more and 0.005 or less. In another example, $L_{1i}/L_0$ and $H_{1i}/H_0$ can be set to values different from the above.

The first outer peripheral side roll-over 10 has a generatrix shape which is at least partially curved and is provided on the outer peripheral edge of the first surface 7. The generatrix shape of the first outer peripheral side roll-over 10 is inclined in a curved shape toward the other axial side as it goes toward the radial outer side. The roll-over has a surface shape in which the inclination (inclination angle) with respect to the reference plane (plane perpendicular to the axial direction) increases toward the edge (corner). The surface of the roll-over 10 has a relatively small inclination with respect to the reference plane in a region relatively far from the edge, and a relatively large inclination with respect to the reference plane in a region relatively close to the edge. The generatrix shape of the first outer peripheral side roll-over 10 has a gentle inclination with respect to the chamfered portion 106 provided on an outer peripheral edge of the thrust race 101*a* (101*b*) having a conventional structure shown in FIG. 17 above and has a small amount of depression (displacement) to the other axial side. As will be described later, the first outer peripheral side roll-over 10 is a part (radial inner portion) of the first outer peripheral side roll-over 21 formed by the punching step using a press.

In an example, when the radial width of the first outer peripheral side roll-over 10 is $L_{1o}$ and the axial width of the first outer peripheral side roll-over 10 is $H_{1o}$, $L_{1o}/L_0$ is 0.03 or more and 0.26 or less, and preferably 0.035 or more and 0.26 or less. Further, $H_{1o}/H_0$ is 0.0025 or more and 0.005 or less. In another example, $L_{1o}/L_0$ and $H_{1o}/H_0$ can be set to values different from the above.

The first flat portion 11 is a surface which is used as the thrust raceway surface 5*a* and is provided at the radial intermediate portion of the first surface 7. That is, the first flat portion 11 is a surface in which the outer peripheral surface having a cylindrical surface shape of the roller 3 rolls (contacts) in the usage state of the thrust rolling bearing 1. The first flat portion 11 has a linear generatrix shape and is configured in a flat surface shape. Additionally, since the first flat portion 11 is not subjected to grinding (plane grinding) as will be described later, it is not a completely flat surface as in the case of grinding, but a substantially flat surface. As will be described later, the first flat portion 11 is configured by a part of a surface of a metal plate 15 which is a material.

In an example, when the radial width of the first flat portion 11 (thrust raceway surface 5*a*) is Lx, $Lx/L_0$ is 0.47 or more and 0.93 or less. In another example, $Lx/L_0$ can be set to a value different from the above.

The second surface 8 of the thrust race 2*a* includes the second inner peripheral side roll-over 12, the second outer peripheral side roll-over 13, and a second flat portion 14.

The second inner peripheral side roll-over 12 has a generatrix shape which is at least partially curved and is provided on the inner peripheral edge of the second surface 8. The generatrix shape of the second inner peripheral side roll-over 12 is inclined in a curved shape toward one axial side as it goes toward the radial inner side. The roll-over 12 has a surface shape in which the inclination (Inclination angle) with respect to the reference plane (plane perpendicular to the axial direction) increases toward the edge (corner). The surface of the roll-over 12 has a relatively small inclination with respect to the reference plane in a region relatively far from the edge, and a relatively large inclination with respect to the reference plane in a region relatively close to the edge. The generatrix shape of the second inner peripheral side roll-over 12 has a gentle inclination with respect to the chamfered portion 106 provided on the inner peripheral edge of the thrust race 101*a* (101*b*) having a conventional structure shown in FIG. 17 above and has a small amount of depression toward one axial side. As will be described later, the second inner peripheral side roll-over 12 is formed by the depressing step.

In an example, when the radial width of the second inner peripheral side roll-over 12 is $L_{2i}$ and the axial width of the second inner peripheral side roll-over 12 is $H_{2i}$. $L_{2i}/L_0$ is 0.03 or more and 0.26 or less, and preferably 0.035 or more and 0.26 or less. Further, $H_{2i}/H_0$ is 0.0025 or more and 0.005 or less. In another example, $L_{2i}/L_0$ and $H_{2i}/H_0$ can be set to a value different from the above.

The second outer peripheral side roll-over 13 has a generatrix shape which is at least partially curved and is provided on the outer peripheral edge of the second surface 8. The generatrix shape of the second outer peripheral side roll-over 13 is inclined in a curved shape toward one axial side as it goes toward the radial outer side. The roll-over 13 has a surface shape in which the inclination (inclination angle) with respect to the reference plane (plane perpendicular to the axial direction) increases toward the edge (corner). The surface of the roll-over 13 has a relatively small inclination with respect to the reference plane in a region relatively far from the edge, and a relatively large inclination with respect to the reference plane in a region relatively close to the edge. The generatrix shape of the second outer peripheral side roll-over 13 has a gentle inclination with respect to the chamfered portion 106 provided on the outer peripheral edge of the thrust race 101*a* (101*b*) having a conventional structure shown in FIG. 17 above and has a small amount of depression toward one axial side. As will be described later, the second outer peripheral side roll-over 13 is formed by the depressing step.

In this example, when the radial width of the second outer peripheral side roll-over 13 is $L_{2o}$ and the axial width of the second outer peripheral side roll-over 13 is $H_{2o}$, $L_{2o}/L_0$ is 0.03 or more and 0.26 or less, and preferably 0.035 or more and 0.26 or less. Further, $H_{2o}/H_0$ is 0.0025 or more and 0.005 or less. In another example, $L_{2o}/L_0$ and $H_{2o}/H_0$ can be set to a value different from the above.

The second flat portion 14 is a surface supported by a backup surface to which the thrust race 2*a* is attached and is provided in the radial intermediate portion of the second surface 8. That is, the second flat portion 14 is a bearing surface supported by the other member in the usage state of the thrust rolling bearing 1. The second flat portion 14 has a linear generatrix shape and is configured in a flat surface shape. Additionally, since the second flat portion 14 is also not subjected to grinding (plane grinding) as will be described later, it is not a completely flat surface as in the case of grinding, but a substantially flat surface. The second flat portion 14 and the first flat portion 11 (thrust raceway surface 5*a*) are parallel to each other. As will be described later, the second flat portion 14 is configured by a part of the axial surface of the metal plate 15 which is a material.

In an example, when the radial width of the second flat portion 14 is Ly, Ly/Lx is 0.6 or more and 1.0 or less. Further, $Ly/L_0$ is 0.47 or more and 0.93 or less. In another example, Ly/Lx and $Ly/L_0$ can be set to a value different from the above.

In the thrust race 2*a* of this example, the first flat portion 11 in the first flat portion 11 provided on the first surface 7 and the second flat portion 14 provided on the second surface 8 is used as the thrust raceway surface 5*a* in which the outer peripheral surface having a cylindrical surface shape of the roller 3 rolls in the usage state of the thrust rolling bearing 1 and the second flat portion 14 is used as a bearing surface. However, when implementing the present invention, the first flat portion 11 can be used as the bearing surface and the second flat portion 14 can be used as the thrust raceway surface 5*a*.

<Thrust Race Manufacturing Method>

Next, an example of the method of manufacturing the thrust race 2*a* will be described in order of steps with reference to FIGS. 3 to 9.

Figure 3:
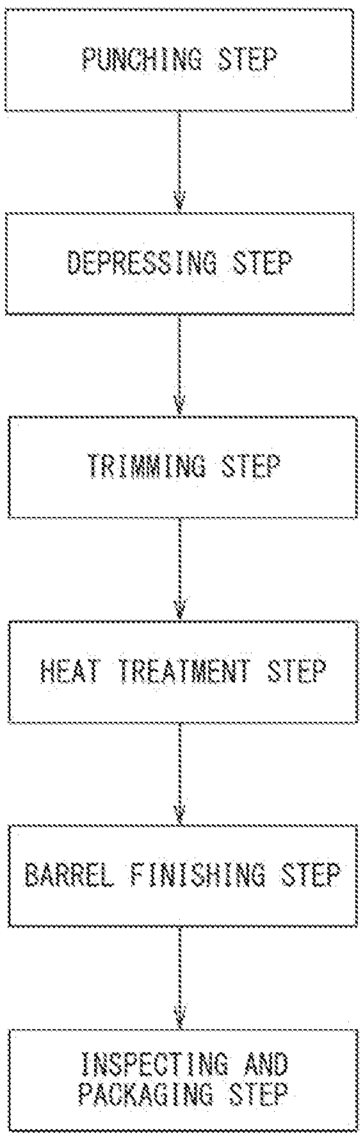
FIG. 3 is a flowchart showing a thrust race manufacturing process.

In this example, as shown in FIG. 3, the thrust race 2*a* is manufactured from the metal plate 15 which is a material by sequentially performing a punching step, a depressing step, a trimming step, a heat treatment step, a barrel finishing step, and an inspecting and packaging step. The manufacturing method of this example does not perform a removal process (post-treatment) such as a grinding process accompanied by the generation of shavings and performed before the heat treatment step in the conventionally known thrust race manufacturing method.

Further, in the manufacturing method of this example, the press working performed in each of the punching step, the depressing step, and the trimming step is performed by a transfer working using a transfer mold. Additionally, the punching step can be performed by another press working machine in consideration of the yield. In this case, it is possible to suppress the generation of scrap by cutting the plate in a staggered arrangement. In this way, when the punching step is performed by another press working machine, a first intermediate material (first piece) 19 to be described latter obtained in the punching step is transferred to the depressing step by a transfer, a robot, or the like.

<<Punching Step>>

In this example, the metal plate (steel plate) 15 made of an iron-based alloy is used as the material (initial material). Specifically, the metal plate 15 is, for example, a cold rolled steel plate (polished steel plate) such as SPCC or SPCE material, a plate material made of carbon steel for machine structure, or a plate material made of chrome molybdenum steel, can be hardened, and has mechanical properties such as desired hardness and surface smoothness. The metal plate 15 has a certain thickness and has high smoothness. The surface roughness of the metal plate 15 is set to Rmax≤2 μm, preferably, Rmax≤1.5 μm in an example to be used as the thrust raceway surface 5*a* (5*b*) by the barrel finishing process performed later. In another example, Rmax can be set to a different value.

Figure 4:
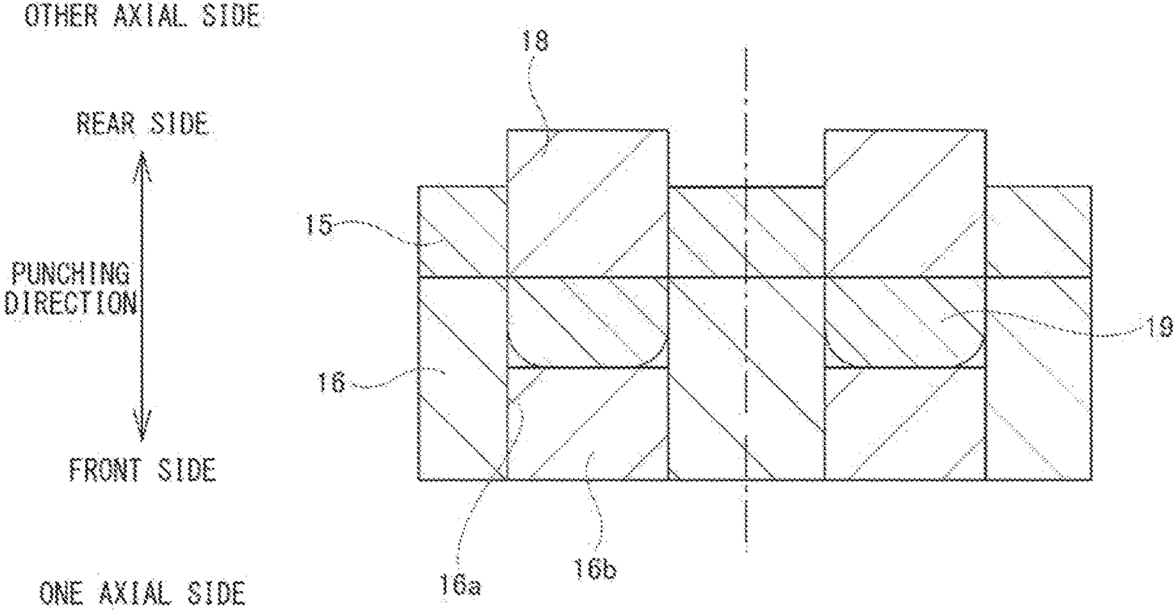
FIG. 4 is a schematic cross-sectional view illustrating a punching step in the thrust race manufacturing process.

In this example, as shown in FIG. 4, in a state in which the metal plate 15 is placed on the first lower mold (lower die) 16 and the metal plate 15 is pressed against the first lower mold 16 by a stripper (not shown), the metal plate 15 is punched in an annular shape by the first upper mold (punching punch, first punch) 18 to be pushed into a first die hole 16*a* having a cylindrical shape provided in the first lower mold 16. Further, in the example shown in the drawing, the metal plate 15 is punched while the metal plate IS is supported from below by a first die cushion 16*b* disposed inside the first die hole 16*a*. The metal plate 15 is punched by using the first punch 18. Accordingly, the first intermediate material (first piece) 19 having an annular flat plate shape is obtained from the metal plate 15. The first piece 19 includes a first surface (7) and a second surface (8) which is a surface on the side opposite to the first surface (7) and the first surface (7) includes roll-overs (20, 21) which are formed on the edge of the first surface (7) in the punching.

Figure 5:
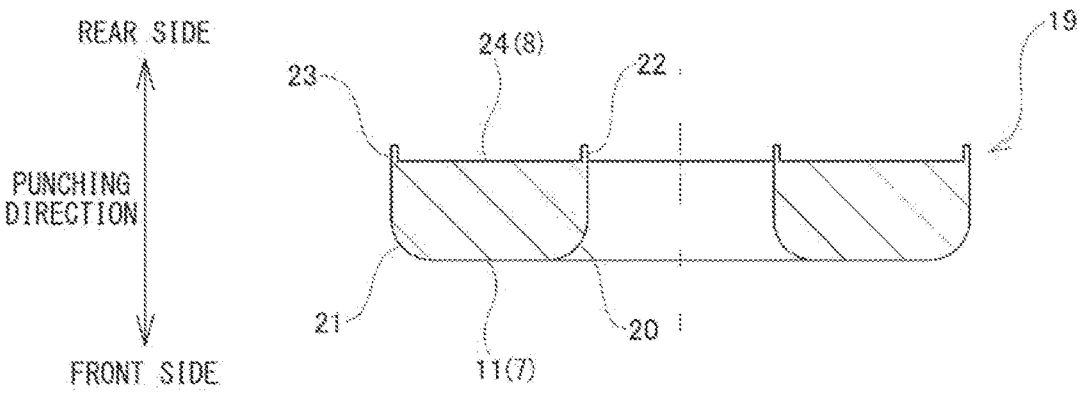
FIG. 5 is a schematic cross-sectional view showing a first intermediate material manufactured by the punching step in the thrust race manufacturing process.

The first intermediate material (first piece) 19 includes, as shown in FIG. 5, the first inner peripheral side roll-over 20, the first outer peripheral side roll-over 21, and the first flat portion 11 formed on the surface (first surface, first axial surface) on one axial side (the lower side of FIG. 5) located on the front side of the punching direction. Further, the first intermediate material 19 includes a second inner peripheral side burr portion 22, a second outer peripheral side burr portion 23, and a second flat portion 24 formed on a surface (second surface, second axial surface) on the other axial side (the upper side of FIG. 5) located on the rear side of the punching direction. Additionally, the front side of the punching direction indicates the downward direction of FIG. 5 which is the front side in the progressing direction when the first upper mold 18 punches the metal plate 15 and the rear side of the punching direction indicates the upward direction of FIG. 5 which is a direction opposite to the traveling direction when the first upper mold 18 punches the metal plate 15.

The first inner peripheral side roll-over 20 is a roll-over which is generated when the metal plate 15 is punched in an annular shape. In an example, the roll-over 20 has a generatrix shape which is at least partially curved and is provided on the inner peripheral edge of one axial surface of the first intermediate material 19. The generatrix shape of the first inner peripheral side roll-over 20 is inclined in a curved shape toward the other axial side as it goes toward the radial inside. The roll-over 20 has a surface shape in which the inclination (inclination angle) with respect to the reference plane (plane perpendicular to the axial direction) increases toward the edge. The surface of the roll-over 20 has a relatively small inclination with respect to the reference plane in a region relatively far from the edge, and a relatively large inclination with respect to the reference plane in a region relatively close to the edge. The generatrix shape of the radial outer portion of the first inner peripheral side roll-over 20 has the same shape as the generatrix shape of the first inner peripheral side roll-over 9. In an example, both the radial width and the axial width of the first inner peripheral side roll-over 20 are larger than the radial width and the axial width of the first inner peripheral side roll-over 9. The first inner peripheral side roll-over 20 corresponds to the roll-over removed before the heat treatment step in the conventional thrust race manufacturing method.

The first outer peripheral side roll-over 21 is a roll-over which is generated when the metal plate 15 is punched in an annular shape. In an example, the roll-over 21 has a generatrix shape which is at least partially curved and is provided on the outer peripheral edge of one axial surface of the first intermediate material 19. The generatrix shape of the first outer peripheral side roll-over 21 is inclined in a curved shape toward the other axial side as it goes toward the radial outside. The roll-over 21 has a surface shape in which the inclination (inclination angle) with respect to the reference plane (plane perpendicular to the axial direction) increases toward the edge. The surface of the roll-over 21 has a relatively small inclination with respect to the reference plane in a region relatively far from the edge, and a relatively large inclination with respect to the reference plane in a region relatively close to the edge. The generatrix shape of the radial inner portion of the first outer peripheral side roll-over 21 has the same shape as the generatrix shape of the first outer peripheral side roll-over 10. Both the radial width and the axial width of the first outer peripheral side roll-over 21 are larger than the radial width and the axial width of the first outer peripheral side roll-over 10. The first outer peripheral side roll-over 21 corresponds to the roll-over removed before the heat treatment step in the conventional thrust race manufacturing method.

The first flat portion 11 includes a surface on one axial surface (the front side of the punching direction of the metal plate IS substantially not subjected to the removal process such as a grinding process. In other words, a part of one axial surface of the metal plate 15 is used as the first flat portion 11 in a substantially unchanged state (without processing). The first fat portion 11 has a linear generatrix shape and is configured in a flat surface shape.

The second inner peripheral side burr portion 22 is a burr which is generated when the metal plate 15 is punched in an annular shape and is provided on the inner peripheral edge of the other axial surface of the first intermediate material 19. The second inner peripheral side burr portion 22 protrudes toward the other axial side in relation to the second flat portion 24. The second inner peripheral side burr portion 22 is a portion which is removed before the heat treatment step in the conventional thrust race manufacturing method.

The second outer peripheral side burr portion 23 is a burr when the metal plate is punched in an annular shape and is provided on the outer peripheral edge of the other axial surface of the first intermediate material 19. The second outer peripheral side burr portion 23 protrudes toward the other axial side in relation to the second flat portion 24. The second outer peripheral side burr portion 23 is a portion which is removed before the heat treatment step in the conventional thrust race manufacturing method.

The second flat portion 24 includes a surface on the other axial side (the rear side of the punching direction) of the metal plate 15 substantially not subjected to the removal process such as a grinding process. In other words, a part of the other axial surface of the metal plate 15 is used as the second flat portion 24 in a substantially unchanged state (without processing). The second flat portion 24 has a linear generatrix shape and is configured in a flat surface shape. The second flat portion 24 has an inner diameter smaller than that of the first flat portion 11 and an outer diameter larger than that of the first flat portion 11. That is, the radial width of the second flat portion 24 is larger than the radial width of the first flat portion 11.

<<Depressing Step (Coining Step)>>

Figure 6:
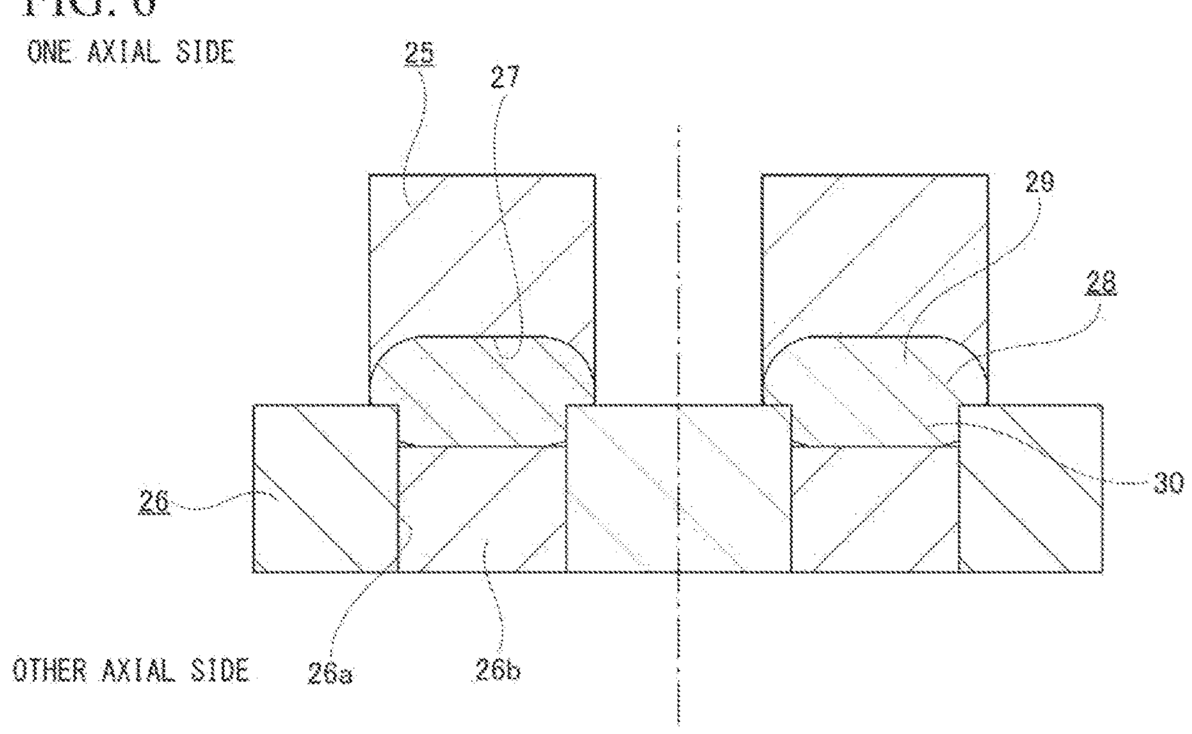
FIG. 6 is a schematic cross-sectional view illustrating a depressing step in the thrust race manufacturing process.
Figure 7:
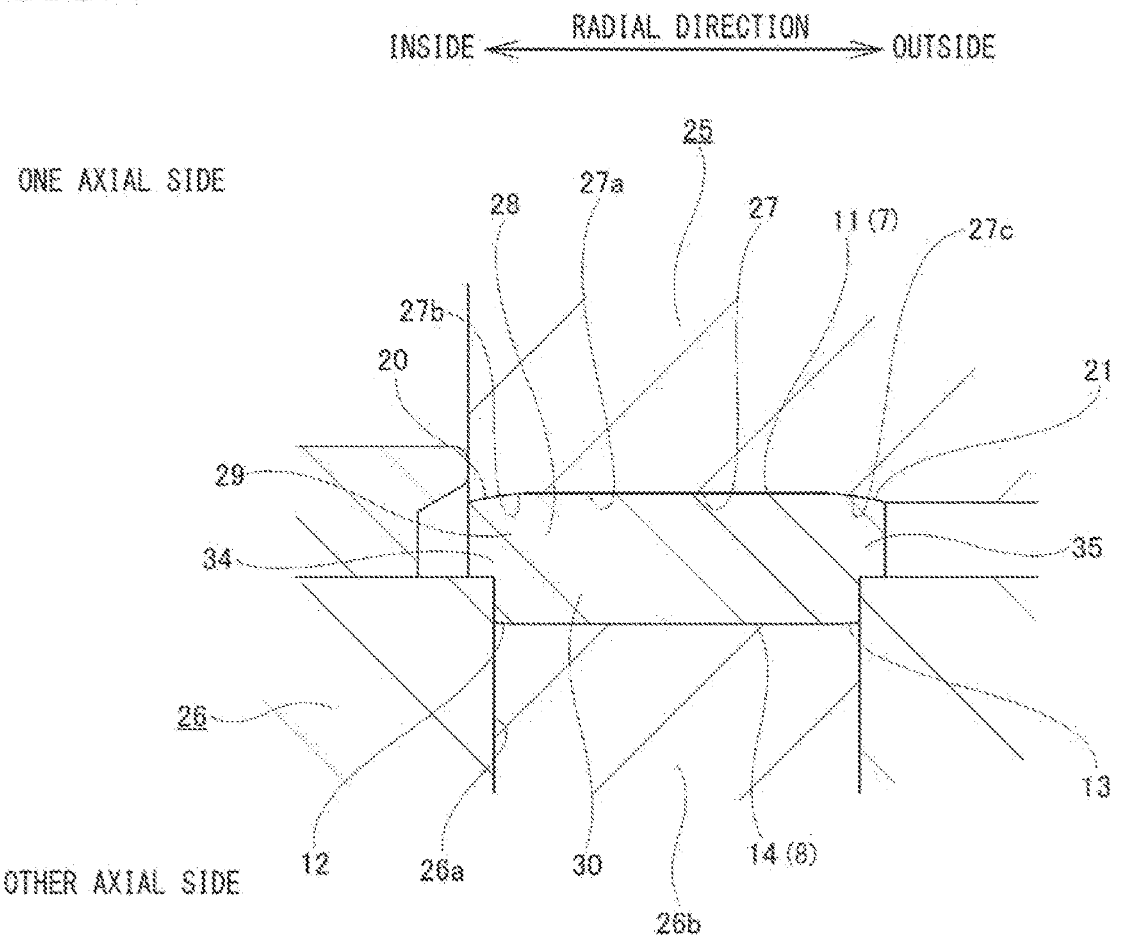
FIG. 7 is a partially enlarged view of FIG. 6.

In this example, the depressing step (coining step) using a press is performed after the punching step using a press. As shown in FIGS. 6 and 7, the depressing step is performed in such a manner that the first intermediate material (first piece) 19 obtained by the punching step is depressed and deformed in the axial direction by the second upper mold (push punch, first die) 25 and the second lower (second die) 26.

As shown in FIG. 7, the second upper mold 25 includes a pressing surface 27 having an annular shape as a whole on the lower surface which is a tip surface. The pressing surface 27 has a generatrix shape set to follow the entire surface of one axial surface of the first intermediate material 19. The pressing surface 27 includes a flat pressing surface (flat surface) **27*a* formed at the radial intermediate portion, an inner peripheral curved pressing surface (curved surface) 27*b* formed at the radial inner portion, and an outer peripheral curved pressing surface (curved surface) 27*c* formed at the radial outer portion. The flat pressing surface 27*a* has a linear generatrix shape to contact the first flat portion 11. The inner peripheral curved pressing surface 27*b* has a generatrix shape which is at least partially curved to contact the first inner peripheral side roll-over 20. The outer peripheral curved pressing surface 27*c* has a generatrix shape which is at least partially curved to contact the first outer peripheral side roll-over 21. The second upper mold (first die) 25 is disposed to face the first surface (7) of the first intermediate material (first piece) 19 and the second lower mold (second die) 26 is disposed to face the second surface (8) of the first intermediate material (first piece) 19. The second upper mold (first die) 25 includes the pressing surface 27 which faces the first surface (7). The pressing surface 27 includes the curved surfaces 27*b* and 27*c* which face the roll-over 20 and 21 formed on the edge of the first surface (7) of the first intermediate material (first piece) 19**.

The second lower form 26 includes a second die hole **26*a* having a cylindrical shape. The diameter of the inner peripheral edge of the second die hole 26*a* is larger than the inner diameter of the second flat portion 24 of the first intermediate material 19 and the diameter of the outer peripheral edge of the second die hole 26*a* is smaller than the outer diameter of the second flat portion 24 of the first intermediate material 19. Therefore, the radial width of the second die hole 26*a* is smaller than the radial width of the second flat portion 24 of the first intermediate material 19**.

In this example, the second upper mold 25 corresponding to the first mold (first die) is disposed on one axial side (the upper side of FIGS. 6 and 7) of the first intermediate material 19 corresponding to the front side of the punching direction of the punching step and the second lower mold 26 corresponding to the second mold (second die) is disposed on the other axial side (the loser side of FIGS. 6 and 7) of the first intermediate material 19 corresponding to the rear side of the punching direction of the punching step. Specifically, the first intermediate material 19 is placed on the second lower mold 26 while one axial surface provided with the first inner peripheral side roll-over 20 and the first outer peripheral side roll-over 21 faces upward and the other axial surface provided with the second inner peripheral side burr portion 22 and the second outer peripheral side burr portion 23 faces downward and the second upper mold 25 is disposed above the first intermediate material 19. Further, in this state, the other axial surface of the first intermediate material 19 is supported by a second die cushion **26*b* disposed inside the second die hole 26*a***.

Figure 8:
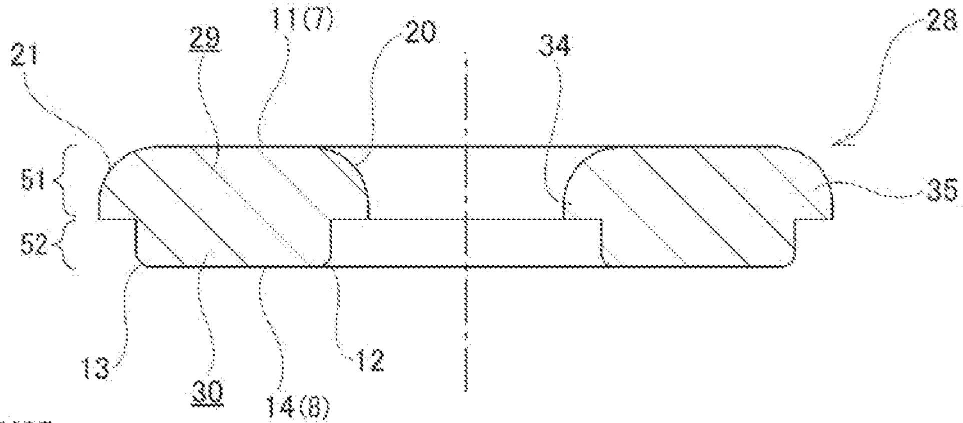
FIG. 8 is a schematic cross-sectional view showing a second intermediate material manufactured by the depressing step in the thrust race manufacturing process.

The first intermediate material 19 is sandwiched between the portions respectively adjacent to the radial inside and the radial outside of the opening portion of the second die hole **26*a* in the upper surface of the second lower mold 26 and the pressing surface 27 of the second upper mold 25 by moving the second upper mold 25 downward to approach the second lower mold 26 after setting the first intermediate material 19. Accordingly, the inner peripheral side portion including the second inner peripheral side burr portion 22 and the outer peripheral side portion including the second outer peripheral side burr portion 23 in the other axial portion of the first intermediate material 19 are depressed and deformed in the axial direction. Then, the radial intermediate portion of the first intermediate material 19 is squeezed (extruded) inside the second die hole 26*a* toward the other axial side. The edge of the second surface (8) of the first piece 19 is depressed and deformed while the first piece 19 is sandwiched between the first die 25 and the second die 26. Accordingly, the second intermediate material (second piece) 28 shown in FIG. 8 is obtained. The second piece 28 includes a first portion 51 including a first surface (7) having the roll-overs 20 and 21 and a second portion 52 including a second surface (8**) having a depressed edge.

The second intermediate material 28 includes a large width portion 29 formed at a half portion on one axial side (the upper side of FIG. 8) and a small width portion 30 formed at a half portion on the other axial side (the lower side of FIG. 8) to have a radial width smaller than that of the large width portion 29. The small width portion 30 has an inner diameter larger than that of the large width portion 29 and has an outer diameter smaller than that of the large width portion 29. The second inner peripheral side burr portion 22 and the second outer peripheral side burr portion 23 provided on the other axial surface of the first intermediate material 19 disappear when the inner peripheral side portion and the outer peripheral side portion on the other axial portion of the first intermediate material 19 are depressed and deformed in the axial direction and those burr portions become a part of the large width portion 29. In an example, the thickness of the second portion 52 (the depth of the recess) of the second intermediate material (second piece) 28 is ⅕ or more and ⅘ or less, ¼ or more and ¾ or less, or ⅓ or more and ⅔ or less of the total thickness of the second piece 28. These ranges are advantageous in improving the quality of the press-formed product and/or optimizing the balance between the depressing step and the trimming step. For example, the thickness of the second portion 52 of the second piece 28 is about ⅕, ¼, ⅓, ½, ⅔, ¾, or ⅘ of the total thickness of the second piece 28. This value can be set appropriately according to the material, shape, or the like of the piece. In another example, the thickness of the second portion 52 of the second piece 28 can be set to a value different from the above.

One axial surface of the second intermediate material 28 (large width portion 29) includes the first inner peripheral side roll-over 20, the first outer peripheral side roll-over 21, and the first flat portion 11. That is, one axial surface of the second intermediate material 28 does not substantially change from one axial surface of the first intermediate material 19.

On the other hand, the other axial surface of the second intermediate material 28 (small width portion 30) includes the second inner peripheral side roll-over 12, the second outer peripheral side roll-over 13, and the second flat portion 14.

The second inner peripheral side roll-over 12 is a roll-over which is generated when the radial intermediate portion of the first intermediate material 19 is squeezed into the second die hole 26*a*, has a generatrix shape which is at least partially curved, and is provided on the inner peripheral edge of the other axial surface of the second intermediate material 28 (small width portion 30).

The second outer peripheral side roll-over 13 is a roll-over which is generated when the radial intermediate portion of the first intermediate material 19 is squeezed into the second die hole 26*a*, has a generatrix shape which is at least partially curved, and is provided on the outer peripheral edge of the other axial surface of the second intermediate material 28 (small width portion 30).

In this example, as shown in FIG. 7, the pressing surface 27 of the second upper mold 25 has a generatrix shape matching one axial surface of the first intermediate material 19 and the first inner peripheral side roll-over 20 and the first outer peripheral side roll-over 21 provided on one axial surface of the first intermediate material 19 are restrained (held) and depressed and deformed by the pressing surface 27. Therefore, it is possible to prevent the bending deformation of the first intermediate material 19 when the radial intermediate portion of the first intermediate material 19 is squeezed. Thus, it is possible to reduce the second inner peripheral side roll-over 12 and the second outer peripheral side roll-over 13. Specifically, it is possible to sufficiently reduce both the radial width and the axial width compared to the first inner peripheral side roll-over 20 and the first outer peripheral side roll-over 21 which are generated by a punching process.

The second flat portion 14 includes a radial intermediate portion (a portion excluding the inner peripheral side portion and the outer peripheral side portion) of the second flat portion 24 provided on the other axial surface of the first intermediate material 19. Therefore, the second flat portion 14 includes a surface on the other axial side (the rear side of the punching direction of the metal plate 15 which is substantially not subjected to the removal process such as a grinding process. The second flat portion 14 has a linear generatrix shape and is configured in a flat surface shape.

<<Trimming Step (Inner and Outer Edging Step)>>

Figure 9:
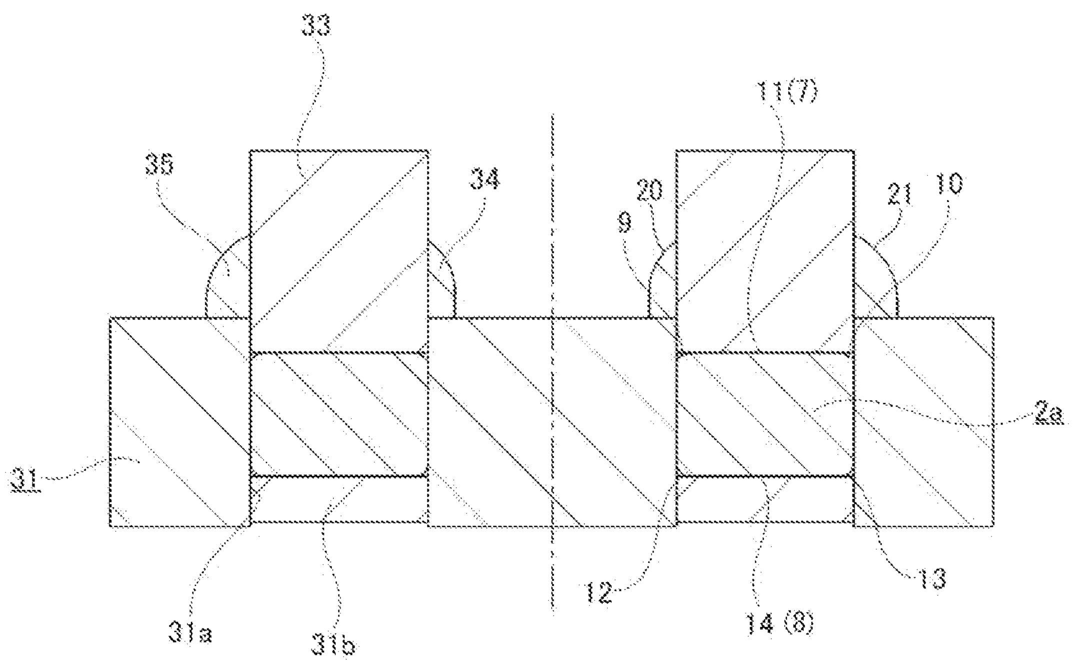
FIG. 9 is a schematic cross-sectional view illustrating a trimming step in the thrust race manufacturing process.

In this example, the trimming step using a press is performed after the depressing step using a press. As shown in FIG. 9, the trimming step is performed in such a manner that the second intermediate material (second piece) 28 is pushed into the third die hole 31*a* having a cylindrical shape by the third upper mold (second punch) 33 while the second intermediate material 28 obtained by the depressing step is placed on the third lower mold 31 and one axial surface of the second intermediate material 28 is pressed by a stripper (not shown). In the example shown in the drawing, the trimming step is performed while supporting the other axial surface of the second intermediate material 28 by the third die cushion 31*b* disposed inside the third die hole 31*a*. The diameter of the inner peripheral edge of the third die hole 31*a* is substantially the same as the inner diameter of the small width portion 30 of the second intermediate material 28 and the diameter of the outer peripheral edge of the third die hole 31*a* is substantially the same as the outer diameter of the small width portion 30 of the second intermediate material 28. The trimming of the second intermediate material (second piece) using the press working includes removing at least a part of the edge of the first portion 51 in the second piece 28.

In the trimming step of this example, a radial inner overhang portion 34 having a rectangular cross-sectional shape and protruding inward in the radial direction from the small width portion 30 and a radial outer overhang portion 35 having a rectangular cross-sectional shape and protruding outward in the radial direction from the small width portion 30 in the large width portion 29 of the second intermediate material 28 are respectively removed as annular scraps by the portions respectively adjacent to the radial inside and the radial outside of the opening portion of the third die hole 31*a* in the upper surface of the third lower mold 31. The removal of the radial outer overhang portion 35 and the removal of the radial inner overhang portion 34 can be performed at the same time or can be performed at different timings. The trimming removes at least a part of the edge of the second intermediate material (second piece) 28 so that a part of the region provided with the roll-overs 20 and 21 in the first surface (7) remains. In the region provided with the roll-overs 20 and 21, a region close to the edge is removed and a region far from the edge remains.

When each of the radial inner overhang portion 34 and the radial outer overhang portion 35 is removed from the large width portion 29, the radial width of the large width portion 29 is substantially the same as the radial width of the wall width portion 30. Further, the first inner peripheral side roll-over 20 provided on the inner peripheral edge of one axial surface of the second intermediate material 28 (large width portion 29) becomes the first inner peripheral side roll-over 9 by removing the range from the radial inner portion to the radial intermediate portion so that only the radial outer portion remains. Further, the first outer peripheral side roll-over 21 provided on the outer peripheral edge of one axial surface of the second intermediate material 28

(large width portion 29) becomes the first outer peripheral side roll-over 10 by removing the range from the radial outer portion to the radial intermediate portion so that only the radial inner portion remains. As a result, it is possible to obtain the thrust race 2*a* in which one axial surface includes the first inner peripheral side roll-over 9, the first outer peripheral side roll-over 10, and the first flat portion 11 and the other axial surface includes the second inner peripheral side roll-over 12, the second outer peripheral side roll-over 13, and the second flat portion 14.

<<Heat Treatment Step>>

The thrust race 2*a* obtained by the trimming step is subjected to a quenching treatment such as a carburizing nitriding quenching treatment or carburizing and quenching treatment and a heat treatment such as a tempering treatment. Accordingly, the hardness of the thrust race 2*a* is increased to about Hv600 to Hv800.

<<Barrel Finishing Step>>

In the barrel finishing step, the thrust race 2*a* subjected to the heat treatment is placed in a container together with a compound or media and the container is rotated or vibrated. Accordingly, the oxidation scale generated on the surface of the thrust race 2*a* is removed. Further, the deburring of the thrust trace 2*a* can be performed and the surface roughness can be improved by the barrel finishing step.

<<Inspecting and Packaging Step>>

After the barrel finishing step, the dimensional inspection and the visual inspection of the thrust race 2*a* are performed. Then, the thrust race 2*a* having passed the inspection is packaged to obtain the finished thrust race 2*a*.

When the thrust race 2*a* manufactured as described above is assembled by combining another thrust race 2*b* manufactured by the same manufacturing method, the plurality of rollers 3, and the cage 4, the thrust rolling bearing 1 of this example can be obtained.

According to the thrust race 2*a* (2*b*) of this example having the above-described configuration and manufactured by the above-described steps, it is possible to suppress an excessive contact surface pressure from being applied to both radial end portions of the thrust raceway surface 5*a* (5*b*) even when a thrust load is applied from the roller 3 to the thrust raceway surface 5*a* (5*b*).

That is, in this example, the first inner peripheral side roll-over 9 and the first outer peripheral side roll-over 10 having a gentler inclination of the generatrix shape (smaller amount of depression in the axial direction) than the chamfered portion provided in the thrust race having a conventional structure are respectively provided on both radial sides of the first flat portion 11 used as the thrust raceway surface 5*a* (5*b*). Therefore, it is possible to suppress an excessive contact surface pressure (edge stress) from being applied to both radial end portions of the thrust raceway surface 5*a* (5*b*) even when the operation condition of the thrust rolling bearing 1 becomes severe. As a result, it is possible to suppress a decrease in the bearing life of the thrust rolling bearing 1.

Further, even when the second flat portion 14 is used as the thrust raceway surface 5*a* (5*b*), the second inner peripheral side roll-over 12 and the second outer peripheral side roll-over 13 provided on both radial sides of the second flat portion 14 have a generatrix shape with a gentler inclination (smaller amount of depression in the axial direction) than the chamfered portion provided in the thrust race having a conventional structure. Therefore, it is possible to suppress an excessive contact surface pressure (edge stress) from being applied to both radial end portions of the thrust raceway surface 5*a* (5*b*) even when the operation condition of the thrust rolling bearing 1 becomes severe.

Further, according to the method of manufacturing the thrust race 2*a* of this example, it is possible to reduce the roll-over generated by a punching process without performing the removal process such as a grinding process accompanied by the generation of shavings.

That is, in this example, each of the first inner peripheral side roll-over 20 and the first outer peripheral side roll-over 21 generated by the punching step can be removed by the trimming step using a press while remaining a part (the radial outer portion of the first inner peripheral side roll-over 20, the radial inner portion of the first outer peripheral side roll-over 21). Therefore, it is possible to reduce the roll-over (first inner peripheral side roll-over 20 and first outer peripheral side roll-over 21) generated by a punching process without performing the removal process such as a grinding process. Thus, it is possible to improve the yield of the thrust race 2*a*. Further, since it is not necessary to perform the removal process, it is possible to suppress a processing cost of the thrust race 2*a*.

Further, in the manufacturing method of this example, since the plate thickness of a portion removed by the trimming step is sufficiently reduced by the depressing step, a large press load is not required in the trimming step. Therefore, it is possible to sufficiently ensure the life of the mold (third upper mold 33 and third lower mold 31) in use. Further, in the trimming step, no secondary sheared surface is generated on the inner peripheral surface and the outer peripheral surface of the thrust race 2*a* which is the sheared surface.

Since the manufacturing method of this example can remove each of the first inner peripheral side roll-over 20 and the first outer peripheral side roll-over 21 generated by the punching step in one trimming step, the number of steps does not increase as in the case of adopting a shaving process. Further, since no thread-like shavings are generated, it is possible to prevent the thrust race 2*a* corresponding to a product from being dented.

In the manufacturing method of this example, none of the first intermediate material 19 obtained by the punching step, the second intermediate material 28 obtained by the depressing step, and the thrust race 2*a* obtained by the trimming step is curved as in the case of performing fine blanking or semi-fine blanking. Further, the manufacturing method of this example can be performed by a general press working machine and does not require dedicated equipment.

Thus, according to the manufacturing method of this example, it is possible to reduce the roll-over generated by a punching process without causing a problem generated by the first to third methods.

Further, in the manufacturing method of this example, the pressing surface 27 of the second upper mold 25 used in the depressing step has a generatrix shape matching one axial surface of the first intermediate material 19 and the first inner peripheral side roll-over 20 and the first outer peripheral side roll-over 21 provided in one axial surface of the first intermediate material 19 are depressed and deformed while being restrained by the pressing surface 27. Therefore, it is possible to reduce the second inner peripheral side roll-over 12 and the second outer peripheral side roll-over 13 formed on both radial sides of the second flat portion 14. Thus, it is not necessary to perform the removal process on the second surface 8 even when the second flat portion 14 is used as the thrust raceway surface.

Second Example of Embodiment

A second example of the embodiment will be described with reference to FIGS. 10 to 15.

In this example, a method of manufacturing the thrust race 2$a$ (2$b$) described in the first example of the embodiment by a manufacturing method different from that of the first example of the embodiment will be described. The method of manufacturing the thrust race 2$a$ (2$b$) of this example is different from the manufacturing method of the first example of the embodiment only in the step performed by the press working. Specifically, in the first example of the embodiment, a case of performing the press working by the transfer working has been described, but in this example, the press working is performed by progressive working. Since the heat treatment step, the barrel finishing step, and the inspecting and packaging step performed after the press working are the same as those of the first example of the embodiment, only the progressive working by the press will be described below.

The manufacturing method of this example obtains the thrust race 2$a$ (2$b$) by intermittently feeding (sequentially feeding rightward in FIG. 11) the metal plate 36 which is a strip-shaped material wound in a coil shape and processing the metal plate 36 in each processing stage provided in a progressive mold (not shown). The metal plate 36 is the same as the metal plate 15 used in the manufacturing method of the first example of the embodiment except that the metal plate is wound in a coil shape.

Figure 10:
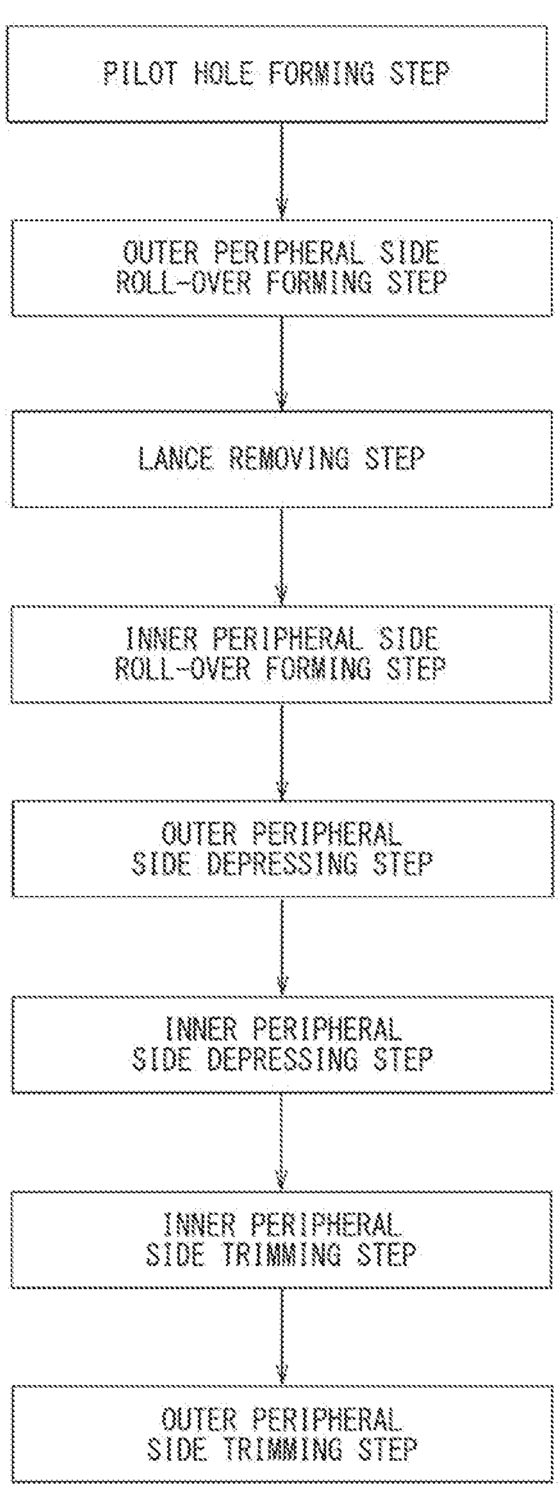
FIG. 10 is a flowchart showing a step performed by a press in a thrust race manufacturing process according to a second embodiment.
Figure 11:
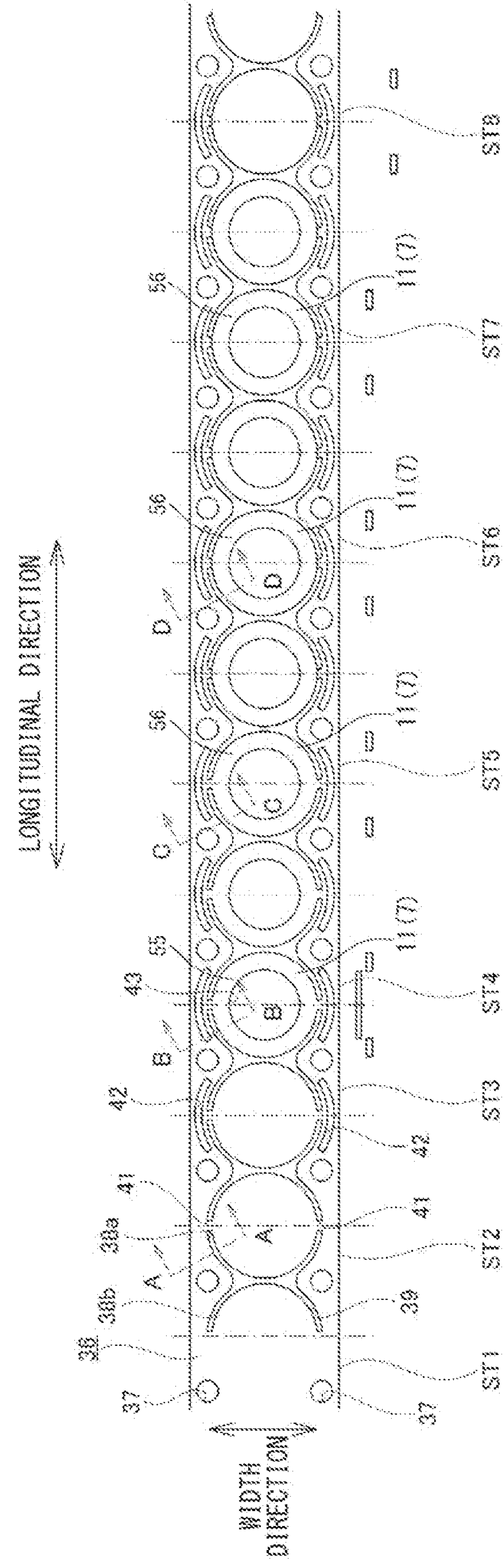
FIG. 11 is a diagram illustrating a step performed by a press in the thrust race manufacturing process.

The manufacturing method of this example includes, as shown in FIG. 10, a pilot hole forming step ST1, an outer peripheral side roll-over forming step (hour glass removing step) ST2, a lance removing step ST3, an inner peripheral side roll-over forming step (center hole removing step) ST4, an outer peripheral side depressing step ST5, an inner peripheral side depressing step ST6, an inner peripheral side trimming step ST7, and an outer peripheral side trimming step (separation step) ST8.

<<Pilot Hole Forming Step ST1>>

The pilot hole forming step ST1 is a step of drilling a pair of pilot holes 37 at both end portions of the metal plate 36 in the width direction. A pilot pin (not shown) is inserted into the pilot hole 37 in each processing stage to accurately position the metal plate 36.

<<Outer Peripheral Side Roll-Over Forming Step ST2>>

The outer peripheral side roll-over forming step ST2 is a step of punching (trimming) an hour glass 39 which is formed by continuing two C-shaped arc grooves 38$a$ and 38$b$ facing the opposite directions in the longitudinal direction of the metal plate 36 in a portion between the pair of pilot boles 37 in the metal plate 36. The inner peripheral edges of two are grooves 38$a$ and 38$b$ have a curvature radius slightly larger than a half of the outer diameter of the thrust race 2$a$.

Figure 12:
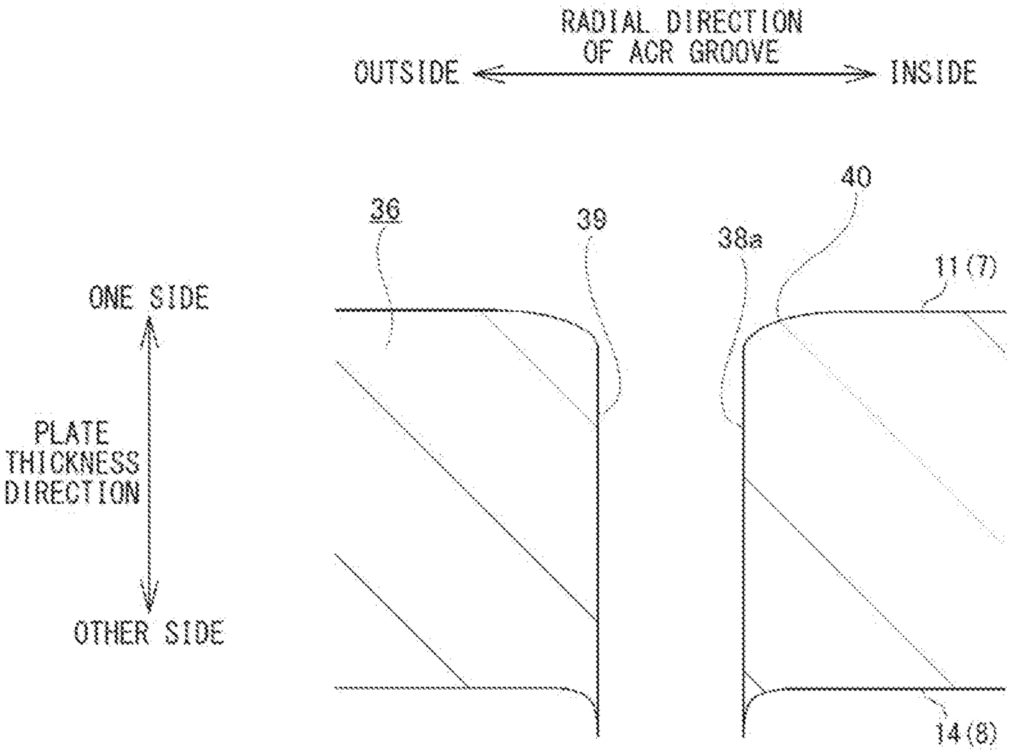
FIG. 12 is a schematic view corresponding to a cross-section of a line A-A of FIG. 11.

Accordingly, as shown in FIG. 12, an outer peripheral side roll-over 40 is formed along the arc grooves 38$a$ and 38$b$ in the radially adjacent portion of the arc grooves 38$a$ and 38$b$ in the metal plate 36. The outer peripheral side roll-over 40 is formed on one surface of the metal plate 36 located on the rear side of the punching direction. Further, a pair of joint portions 41 is formed between the pair of hour glasses 39 adjacent to each other in the longitudinal direction of the metal plate 36. The punching direction (direction of punching out or pulling up) of the metal plate 36 is determined in consideration of the depressing direction of the outer peripheral side depressing step ST5 and the inner peripheral side depressing step ST6 which are the subsequent steps and the specifications of the processing equipment or the like.

Additionally, one surface of the metal plate 36 indicates a surface located on one side of the plate thickness direction of the metal plate 36 and the other surface of the metal plate 36 indicates a surface located on the other side of the plate thickness direction of the metal plate 36.

The outer peripheral side roll-over 40 has a generatrix shape which is at least partially curved. The generatrix shape of the outer peripheral side roll-over 40 is inclined in a curved shape toward the front side of the punching direction (toward the other surface of the metal plate 36) as it goes toward the radial outside (toward the arc grooves 38$a$ and 38$b$). The roll-over 40 has a surface shape in which the inclination (inclination angle) with respect to the reference plane (plane perpendicular to the axial direction) increases toward the edge. The surface of the roll-over 40 has a relatively small inclination with respect to the reference plane in a region relatively far from the edge, and a relatively large inclination with respect to the reference plane in a region relatively close to the edge. The generatrix shape of the radial inner portion of the outer peripheral side roll-over 40 has the same shape as the generatrix shape of the first outer peripheral side roll-over 10. Both the radial width and the axial width of the outer peripheral side roll-over 40 are larger than the radial width and the axial width of the first outer peripheral side roll-over 10.

<<Lance Removing Step ST3>>

The lance removing step ST3 is a step of punching (trimming) a lance 42 which is an arc slit (discard hole) in a portion between a pair of pilot boles 37 adjacently in the longitudinal direction of the metal plate 36 and in the vicinity of the joint portion 41. The lance 42 has a role of preventing the feed pitch of the metal plate 36 and the center of the progressive mold (the center of the processing stage) from deviating in the outer peripheral side depressing step ST5 to be performed later. In the outer peripheral side depressing step, when the deviation between the feed pitch of the metal plate 36 and the center of the progressive mold can be prevented, the lance removing step can be omitted.

<<Inner Peripheral Side Roll-Over Forming Step ST4>>

The inner peripheral side roll-over forming step ST4 is a step of drilling a circular hole (center hole) 43 in a portion between a pair of hour glasses 39 (are grooves 39$a$ and 39$b$) disposed adjacently in the longitudinal direction of the metal plate 36. The diameter of the circular hole 43 is slightly smaller than the inner diameter of the thrust race 2$a$.

Figure 13:
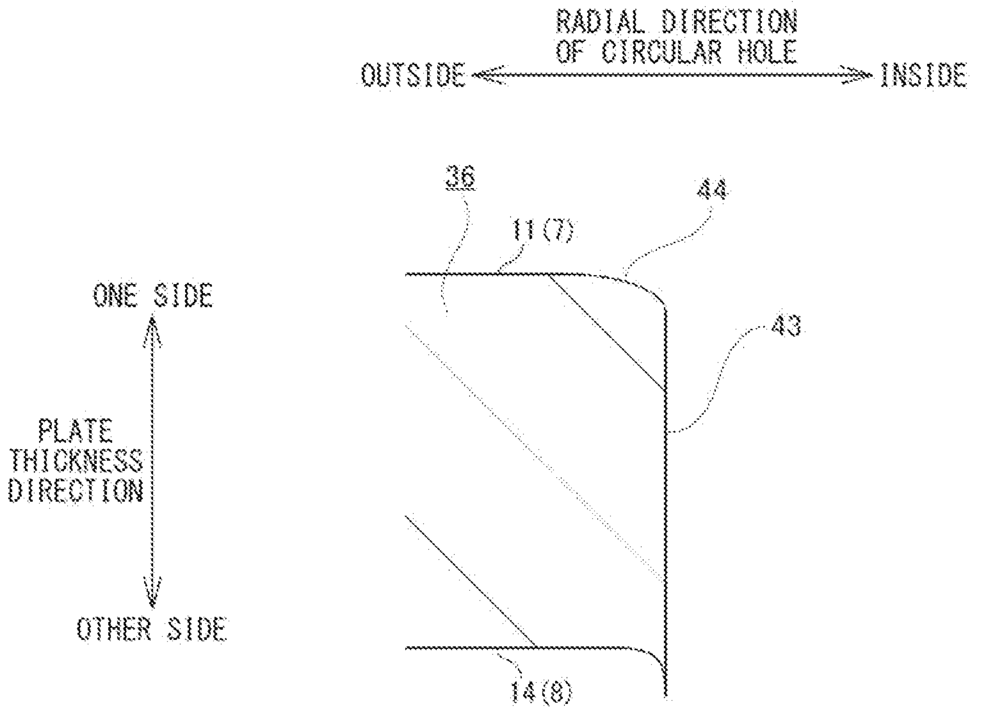
FIG. 13 is a schematic view corresponding to a cross-section of a line B-B of FIG. 11.

Accordingly, as shown in FIG. 13, an inner peripheral side roll-over 44 is formed along the circular hole 43 in a portion adjacent to the radial outside of the circular hole 43 in the metal plate 36. Further, the inner peripheral side roll-over 44 is formed on one surface of the metal plate 36 located on the rear side of the punching direction. That is, both the inner peripheral side roll-over 44 and the outer peripheral side roll-over 40 are formed on one surface of the metal plate 36.

The inner peripheral side roll-over 44 has a generatrix shape which is at least partially curved. The generatrix shape of the inner peripheral side roll-over 44 is inclined in a curved shape toward the front side of the punching direction (toward the other surface of the metal plate) as it goes toward the radial inside (toward the circular hole 43). The roll-over 44 has a surface shape in which the inclination (inclination angle) with respect to the reference plane (plane perpendicular to the axial direction) increases toward the edge (corner). The surface of the roll-over 44 has a relatively small inclination with respect to the reference plane in a region relatively far from the edge, and a relatively large inclination with respect to the reference plane in a region relatively close to the edge. The generatrix shape of the radial outer portion of the inner peripheral side roll-over 44 has the same shape as the generatrix shape of the first inner peripheral side roll-over 9. Both the radial width and the axial width of the inner peripheral side roll-over 44 are larger than the radial width and the axial width of the first inner peripheral side roll-over 9.

<<Outer Peripheral Side Depressing Step ST5>>

Figure 14:
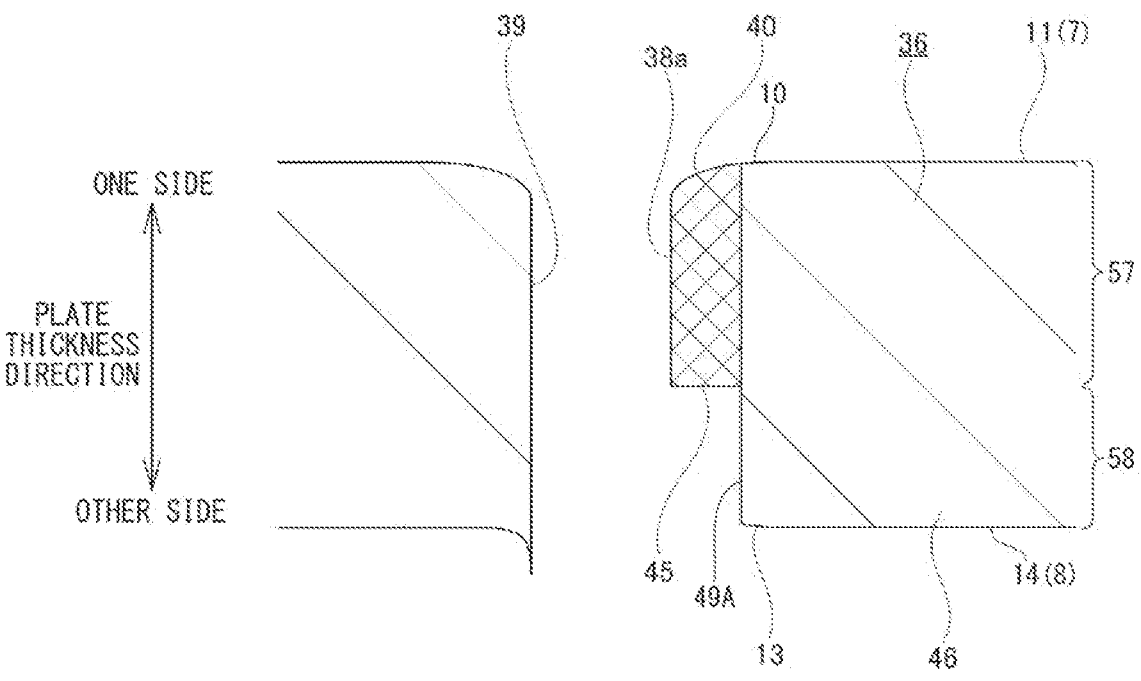
FIG. 14 is a schematic view corresponding to a cross-section of a line C-C of FIG. 11.

The outer peripheral side depressing step ST5 is a step of forming an outer peripheral annular groove 45 shown in FIG. 14 by depressing an annular portion including a portion matching the outer peripheral side roll-over 40 and the joint portion 41 in the plate thickness direction of the metal plate 36 in the other surface of the metal plate 36 in the plate thickness direction of the metal plate 36. Specifically, a portion matching the range from the radial outer portion to the radial intermediate portion of the outer peripheral side roll-over 40 in the other surface of the metal plate 36 in the plate thickness direction of the metal plate 36 is depressed and deformed. Farther, in this example, the pressing surface of the upper mold (not shown) pressing one surface of the metal plate 36 is assumed to have a generatrix shape matching the generatrix shape of the outer peripheral side roll-over 40 and the outer peripheral side roll-over 40 is depressed and deformed while being restrained.

Accordingly, an outer squeezing portion 46 having an outer peripheral surface shape of a substantially cylindrical surface shape and squeezed toward the other side in the plate thickness direction of the metal plate 36 is formed on the radial inside of the outer peripheral annular groove 45 in the other surface of the metal plate 36. The second outer peripheral side roll-over 13 is formed on the outer peripheral edge on the other axial surface of the outer squeezing portion 46. Further, this step is performed by regulating the dimension of the lower mold (die hole) (not shown) pressing the other surface of the metal plate 36 so that the outer diameter of the formed outer squeezing portion 46 is slightly larger than the diameter of the inner peripheral edge of the outer peripheral side roll-over 40.

<<Inner Peripheral Side Depressing Step ST6>>

Figure 15:
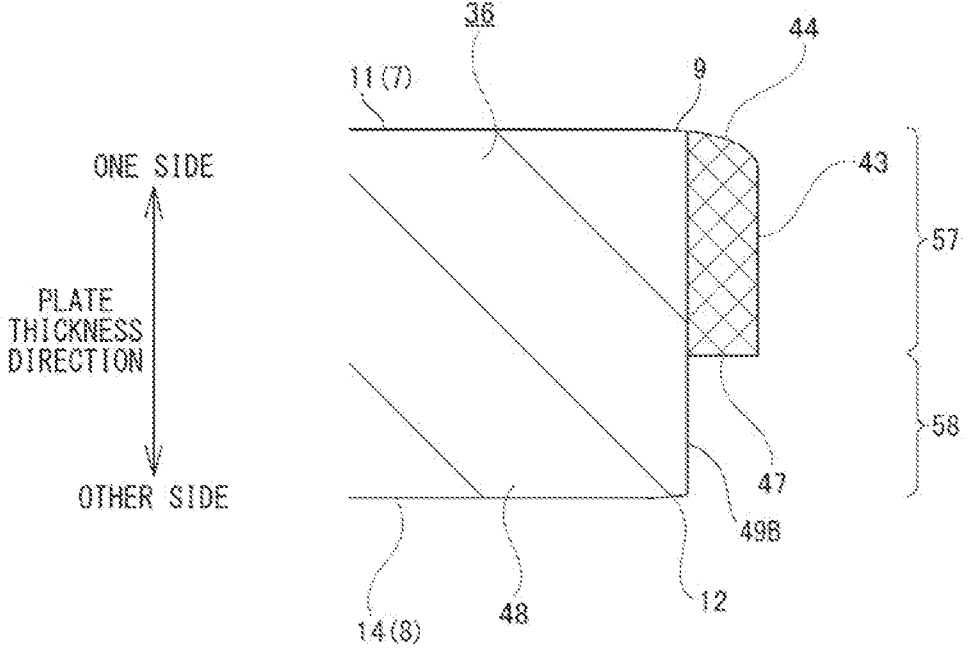
FIG. 15 is a schematic view corresponding to a cross-section of a line D-D of FIG. 11.
Figure 16:
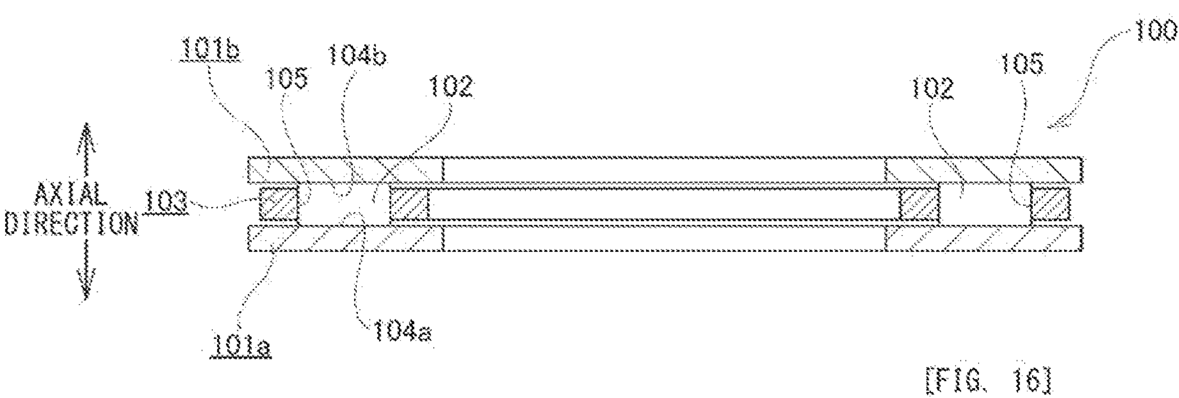
FIG. 16 is a cross-sectional view showing an example of a thrust rolling bearing having a conventional structure.

The inner peripheral side depressing step ST6 is a step of forming an inner peripheral annular groove 47 shown in FIG. 15 by depressing an annular portion including a portion matching the inner peripheral side roll-over 44 in the plate thickness direction of the metal plate 36 in the other surface of the metal plate 36 in the plate thickness direction of the metal plate 36. Specifically, a portion matching the range from the radial inner portion to the radial intermediate portion of the inner peripheral side roll-over 44 in the other surface of the metal plate 36 in the plate thickness direction of the metal plate 36 is depressed and deformed. Further, in this example, the pressing surface of the upper mold (not shown) pressing one surface of the metal plate 36 is assumed to have a generatrix shape matching the generatrix shape of the inner peripheral side roll-over 44 and the inner peripheral side roll-over 44 is depressed and deformed while being restrained.

Accordingly, an inner squeezing portion 48 having an inner peripheral surface shape of a substantially cylindrical surface shape and squeezed toward the other side in the plate thickness direction of the metal plate 36 is formed on the radial outside of the inner peripheral annular groove 47 in the other surface of the metal plate 36. The second inner peripheral side roll-over 12 is formed on the inner peripheral edge of the other axial surface of the inner squeezing portion 48. Further, the second flat portion 14 which is configured from the other surface of the metal plate 36 and has a linear generatrix shape and a flat surface shape is formed in a portion between the second inner peripheral side roll-over 12 and the second outer peripheral side roll-over 13. Further, this step is performed by regulating the dimension of the lower mold (die hole) (not shown) pressing the other surface of the metal plate 36 so that the inner diameter of the formed inner squeezing portion 48 is slightly smaller than the diameter of the outer peripheral edge of the inner peripheral side roll-over 44.

<<Inner Peripheral Side Trimming Step ST7>>

The inner peripheral side trimming step ST7 is a step of removing a portion (oblique grid pattern portion of FIG. 15) matching the inner peripheral annular groove 47 in the plate thickness direction of the metal plate 36 in the metal plate 36 as an annular scrap. Accordingly, since the range from the radial inner portion to the radial intermediate portion of the inner peripheral side roll-over 44 is removed, only the radial outer portion remains and the first inner peripheral side roll-over 9 is obtained.

<<Outer Peripheral Side Trimming Step (Separation Step) ST8>>

The outer peripheral side trimming step ST8 is a step of removing a portion (oblique grid pattern portion of FIG. 14) matching the outer peripheral annular groove 45 in the plate thickness direction of the metal plate 36 in the metal plate 36 as an annular scrap. Accordingly, since the range from the radial outer portion to the radial intermediate portion of the outer peripheral side roll-over 40 is removed, only the radial inner portion remains and the first outer peripheral side roll-over 10 is obtained. Further, the first flat portion 11 which is configured from one surface of the metal plate 36 and has a linear generatrix shape and a flat surface shape is formed in a portion between the first outer peripheral side roll-over 10 and the first inner peripheral side roll-over 9. As a result, the thrust race 2*a* in which one axial surface includes the first inner peripheral side roll-over 9, the first outer peripheral side roll-over 10, and the first flat portion 11 and the other axial surface includes the second inner peripheral side roll-over 12, the second outer peripheral side roll-over 13, and the second flat portion 14 is separated from the metal plate 36. The thrust race 2*a* includes the first surface 7, the second surface 8 which is a surface on the side opposite to the first surface 7, the side surfaces 49A and 49B which connect the first surface 7 and the second surface 8, the first roll-overs 9 and 10 which are formed on the edge of the first surface 7 as a trace of the press working in the vicinity of the corners of the first surface 7 and the side surfaces 49A and 49B, and the second roll-overs 12 and 13 which are formed on the edge of the second surface 8 as a trace of another press working in the vicinity of the corners of the second surface 8 and the side surfaces 49A and 49B. In an example, the surface 49A includes a sheared surface connected to the first roll-over 10 and another sheared surface connected to the second roll-over 13. Further, the surface 49B includes a shared surface connected to the first roll-over 9 and another sheared surface connected to the second roll-over 12. The first roll-overs 9 and 10 include additional traces in which a part of the roll-over formed by first press working is trimmed by second press working. The additional traces can be confirmed on the basis of the surface observation of the roll-overs 9 and 10, the surface observation of the side surfaces 49A and 49B, the observation of the cross-section of the object, the composition analysis of the object, and the like.

Even with the above-described manufacturing method of this example, it is possible to reduce the roll-over generated by a punching process without performing the removal process. Thus, it is possible to improve the yield of the thrust race 2*a*. Further, since it is not necessary to perform the removal process, it is possible to suppress the processing cost of the thrust race 2*a*. When the present invention is implemented, the order of each step can be changed or a plurality of steps can be performed at the same time as long as there is no contradiction. Further, the present invention is not limited to a one-row process, but can be performed by a multiple-row process.

Other configurations, operations, and effects are the same as those of the first example of the embodiment.

The press-formed product of the present invention can be applied to other than the thrust trace shown in each example of the embodiment. Further, the above-described manufacturing method can be applied not only to the rolling bearing manufacturing method but also the method of manufacturing various machines (for example, general machines such as compressors and machine tools) including the rolling bearing. Further, the above-described manufacturing method can also be applied to the method of manufacturing vehicles such as automobiles and railroad vehicles including the rolling bearings. According to such a machine manufacturing method and the vehicle manufacturing method, since the yield of the press formed product is improved and the processing cost of the press-formed product is suppressed, it is possible to improve productivity and reduce costs for machines and vehicles.

Although the embodiments of the present invention have been described above, the present invention is not limited thereto and can be appropriately modified without departing from the technical spirit of the present invention.

When implementing the present invention, the material, hardness, surface roughness, and the like of the metal plate as the material are not limited to those described in each example of the embodiment. Further, when implementing the present invention, the method of the heat treatment step performed after the trimming step is not limited to the one described in each example of the embodiment and a conventionally known method can be appropriately adopted. Further, when implementing the press-formed product manufacturing method of the present invention, a grinding step may be performed or other steps may be performed in order to remove waviness or the like generated by the heat treatment in addition to the steps described in each example of the embodiments. Further, when implementing the present invention, the thrust rolling bearing can be configured by combining the thrust race which is the press-formed product of the present invention with the thrust race other than the press-formed product of the present invention.

In an embodiment, the press-formed product manufacturing method includes: obtaining a first piece (19, 55) by punching a metal material, the first piece (19, 55) including a first surface (7) and a second surface (8) which is a surface on the side opposite to the first surface (7) and the first surface (7) including a roll-over (20, 21, 40, 44) formed on an edge of the first surface (7) in the punching; obtaining a second piece (28, 56) by depressing an edge of the second surface (8) of the first piece (19, 55) while sandwiching the first piece (19, 55) between a first die (25) and a second die (26), the second piece (28, 56) including a first portion (51, 57) having the first surface (7) provided with the roll-over (20, 21, 40, 44) and a second portion (52, 58) having the second surface (8) with the depressed edge; and trimming the second piece (28) by using a press working to remove at least a part of the edge of the first portion (51, 57).

In an example, the trimming includes removing at least a part of the edge of the second piece (28, 56) so that a part of a region provided with the roll-over in the first surface (7) remains.

In an example, the first die (25) is disposed to face the first surface (7) of the first piece (19, 55), the second die (26) is disposed to face the second surface (8) of the first piece (19, 55), the first die (25) includes a pressing surface (27) facing the first surface (7), and the pressing surface (27) includes a curved surface (27*b*, 27*e*) facing the roll-over (20, 21, 40, 44) formed on the edge of the first surface (7) of the first piece (19, 55).

In an embodiment, the pressed product includes a first surface (7), a second surface (8) which is a surface on the side opposite to the first surface, a side surface (49A, 49B) which connects the first surface (7) and the second surface (8), a first roll-over (9, 10) which is formed on the edge of the first surface (7) as a trace of the press working in the vicinity of the corner between the first surface (7) and the side surface (49A, 49B), and a second roll-over (12, 13) which is formed on the edge of the second surface (8) as a trace of another press working in the vicinity of the corner between the second surface (8) and the side surface (49A, 49B).

In an example, the first roll-over (9, 10) includes an additional trace in which a part of a roll-over formed by first press working is trimmed by second press working.

In an embodiment, the press-formed product (2*a*, 2*b*) has an annular flat plate shape. The press-formed product (2*a*, 2*b*) includes a first surface (7) on one axial side and a second surface (8) on the other axial side and the first surface (7) includes a first inner peripheral side roll-over surface (9) provided on the inner peripheral edge, a first outer peripheral side roll-over surface (10) provided on the outer peripheral edge, and a first non-grinding surface (11) having a flat surface shape and provided between the first inner peripheral side roll-over surface (9) and the first outer peripheral side roll-over surface (10). The second surface (8) includes a second inner peripheral side roll-over surface (12) provided on the inner peripheral edge, a second outer peripheral side roll-over surface (13) provided on the outer peripheral edge, and a second non-grinding surface (14) having a flat surface shape and provided between the second inner peripheral side roll-over surface (12) and the second outer peripheral side roll-over surface (13).

In an example, when the radial width of the press-formed product (2*a*, 2*b*) is L0, the axial width of the press-formed product (2*a*, 2*b*) is H0, the radial width of the first inner peripheral side roll-over surface (9) is L1i, the axial width of the first inner peripheral side roll-over surface (9) is H1i, the radial width of the first outer peripheral side roll-over surface (10) is L1o, the axial width of the first outer peripheral side roll-over surface (10) is H1o, the radial width of the second inner peripheral side roll-over surface (12) is L2i, the axial width of the second inner peripheral side roll-over surface (12) is H2i, the radial width of the second outer peripheral side roll-over surface (13) is L2o, and the axial width of the second outer peripheral side roll-over surface (13) is H2o. L1i/L0 can be 0.03 or more and 0.26 or less. H1i/H0 can be 0.0025 or more and 0.005 or less, L1o/L0 can be 0.03 or more and 0.26 or less, H1o/H0 can be 0.0025 or more and 0.005 or less, L2i/L0 can be 0.03 or more and 0.26 or less, H2i/H0 can be 0.0025 or more and 0.005 or less, L2o/L0 can be 0.03 or more and 0.26 or less, and H2o/H0 can be 0.0025 or more and 0.005 or less.

In an embodiment, a rolling bearing includes the press-formed product and a plurality of rolling elements.

In an embodiment, a press-formed product manufacturing method (according to transfer working) includes: a punching step of obtaining a first intermediate material (19) having an annular flat plate shape by punching a metal plate as a material in an annular shape; a depressing step of obtaining a second intermediate material (28) having a large width portion (29) provided on one axial side and a small width portion (30) provided on the other axial side to have a smaller radial width than that of the large width portion (29) by axially depressing inner and outer peripheral portions of the other axial portion of the first intermediate material (19) while axially sandwiching the first intermediate material (19) between a first mold (second upper mold 25) disposed on one axial side of the first intermediate material (19) corresponding to the front side of the punching direction in the punching step and a second mold (second lower mold 26) disposed on the other axial side of the first intermediate material (19) corresponding to the rear side of the punching direction in the punching step; and a trimming step of removing each of a portion (radial inner overhang portion 34) protruding radially inward from the small width portion (30) and a portion (radial outer overhang portion 35) protruding radially outward from the small width portion (30) in the large width portion (29) of the second intermediate material (28).

In an example, one axial surface of the first intermediate material (19) includes each of a first inner peripheral side roll-over surface forming portion (20) formed on the inner peripheral edge and a first outer peripheral side roll-over surface forming portion (21) formed on the outer peripheral edge and the first mold (second upper mold 25) includes a pressing surface (27) having a generatrix shape matching a portion including the first inner peripheral side roll-over surface forming portion (20) and the first outer peripheral side roll-over surface forming portion (21) in one axial surface of the first intermediate material (19).

In another embodiment, a press-formed product manufacturing method (according to progressive working) includes: an outer peripheral side roll-over forming step of forming an outer peripheral side roll-over surface forming portion (40) along an are groove (38*a*. 38*b* (hour glass 39)) in a radially adjacent portion of the are groove (38*a*, 38*b*) in one surface of a metal plate (36) by punching two are grooves (38*a*, 38*b* (hour glass 39)) facing the opposite directions in the longitudinal direction of the metal plate (36) in the metal plate (36) which is a material; an inner peripheral side roll-over forming step of forming an inner peripheral side roll-over surface forming portion (44) along a circular hole (36) in a portion adjacent to the radial outside of a circular hole (43) in one surface of the metal plate (36) by punching the circular hole (43) in a portion located between a pair of outer peripheral side roll-over surface forming portions (40) disposed to be adjacent to each other in the longitudinal direction of the metal plate (36) in the metal plate (36); an outer peripheral side depressing step of forming an outer peripheral annular groove (45) by depressing an annular portion including a portion matching the radial outer portion of the outer peripheral side roll-over surface forming portion (40) in the plate thickness direction of the metal plate (36) in the other surface of the metal plate (36) in the plate thickness direction of the metal plate (36); an inner peripheral side depressing step of forming an inner peripheral annular groove (47) by depressing an annular portion including a portion matching the radial inner portion of the inner peripheral side roll-over surface forming portion (44) in the plate thickness direction of the metal plate (36) in the other surface of the metal plate (36) in the plate thickness direction of the metal plate (36); an inner peripheral side trimming step of removing a portion matching the inner peripheral annular groove (47) in the plate thickness direction of the metal plate (36) in the metal plate (36); and an outer peripheral side trimming step of removing a portion matching the outer peripheral annular groove (45) in the plate thickness direction of the metal plate (36) in the metal plate (36).

In an embodiment, a method of manufacturing a rolling bearing including a press-formed product and a plurality of rolling elements includes: manufacturing the press-formed product by any of the press-formed product manufacturing methods; and assembling a rolling bearing by using the manufactured press-formed product and the plurality of rolling elements.

In an embodiment, a method of manufacturing a vehicle including a rolling bearing includes manufacturing the rolling bearing by the rolling bearing manufacturing method.

In an embodiment, a method of manufacturing a machine including a rolling bearing includes manufacturing the rolling bearing by the rolling bearing manufacturing method.

In an embodiment, the press-formed product has a flat plate shape. In the above-described embodiment, the press-formed product has an annular flat plate shape. In another embodiment, the press-formed product can have a disk shape. It is needless to say that the disk-shaped press-formed product can be manufactured by the above-described manufacturing method. In another embodiment, the press-formed product can have a different shape. The press-formed product can be manufactured by referring to any of the above-described methods.

REFERENCE SIGNS LIST

1 Thrust rolling bearing
2*a*, 2*b* Thrust race (press-formed product)
3 Roller
4 Cage
4*a*, 4*b* Metal plate
5*a*, 5*b* Thrust raceway surface
6 Pocket
7 First surface
8 Second surface
9 First inner peripheral side roll-over
10 First outer peripheral side roll-over
11 First flat portion (non-grinding surface)
12 Second inner peripheral side roll-over
13 Second outer peripheral side roll-over
14 Second flat portion (non-grinding surface)
15 Metal plate
16 First lower mold
16*a* First die hole
16*b* First die cushion
18 First upper mold
19 First intermediate material
20 First inner peripheral side roll-over
21 First outer peripheral side roll-over
22 Second Inner peripheral side burr portion
23 Second outer peripheral side burr portion
24 Second flat portion
25 Second upper mold
26 Second lower mold
26*a* Second die hole
26*b* Second die cushion
27 Pressing surface
27*a* Flat pressing surface
27*b* Inner peripheral curved pressing surface
27*c* Outer peripheral curved pressing surface
28 Second intermediate material
29 Large width portion
30 Small width portion
31 Third lower mold

31*a* Third die hole
31*b* Third die cushion
33 Third upper mold
34 Inner radial overhang portion
35 Outer radial overhang portion
36 Metal plate
37 Pilot hole
38*a*, 38*b* Arc groove
39 Hour glass
40 Outer peripheral side roll-over
41 Joint portion
42 Lance
43 Circular hole
44 Inner peripheral side roll-over
45 Outer peripheral annular groove
46 Outer squeezing portion
47 Inner peripheral annular groove
48 Inner squeezing portion
100 Thrust rolling bearing
101*a*, 101*b* Thrust rave
102 Roller
103 Cage
104*a*, 104*b* Thrust raceway surface
105 Pocket
106 Chamfered portion

The invention claimed is:

1. A method of manufacturing a press-formed product, comprising:

obtaining a first piece by punching a metal material, the first piece including a first surface and a second surface, the second surface being a surface on the side opposite to the first surface, the first surface including a roll-over formed on an edge of the first surface by the punching;

obtaining a second piece by depressing an edge of the second surface of the first piece along an axial direction so that a side surface along the axial direction is formed while sandwiching the first piece between a first die and a second die and while the roll-over of the first piece is restrained by a pressing surface of the first die, the second piece including a first portion having the first surface provided with the roll-over and a second portion having the second surface with the depressed edge; and trimming the second piece by using press working to remove at least a part of the edge of the first portion.

2. The method of manufacturing a press-formed product according to claim 1, wherein the trimming includes removing at least a part of the edge of the second piece so that a part of a region provided with the roll-over in the first surface remains.

3. The method of manufacturing a press-formed product according to claim 1, wherein the first die is disposed to face the first surface of the first piece, wherein the second die is disposed to face the second surface of the first piece, wherein the first die includes the pressing surface facing the first surface, and wherein the pressing surface includes a curved surface facing the roll-over formed on the edge of the first surface of the first piece.

4. A method of manufacturing a rolling bearing including a press-formed product and a plurality of rolling elements, the method comprising:

manufacturing the press-formed product by the press-formed product manufacturing method according to claim 1; and assembling a rolling bearing by using the manufactured press-formed product and the plurality of rolling elements.

5. A method of manufacturing a vehicle including a rolling bearing, comprising:

manufacturing the rolling bearing by the rolling bearing manufacturing method according to claim 4.

6. A method of manufacturing a machine including a rolling bearing, comprising:

manufacturing the rolling bearing by the rolling bearing manufacturing method according to claim 4.

7. A rolling bearing comprising:

a press-formed product manufactured by the press-formed product manufacturing method according to claim 1; and a plurality of rolling elements.

8. The method of manufacturing a press-formed product according to claim 1, wherein a direction of the trimming for the removal of the at least a part of the edge of the first portion is the same as a direction of the depressing for the edge of the second surface.

* * * * *